(12) United States Patent
Woods et al.

(10) Patent No.: US 10,836,652 B2
(45) Date of Patent: Nov. 17, 2020

(54) CONTINUOUS FLOW METHODS AND APPARATUSES FOR PROCESSING HUMAN WASTE

(71) Applicant: Sanivation LLC, Wilmington, DE (US)

(72) Inventors: Emily Christine Woods, Oakland, CA (US); Andrew Merrill Foote, Aurora, OH (US)

(73) Assignee: Sanivation LLC, Wilmington, DE (US)

( * ) Notice: Subject to any disclaimer, the term of this patent is extended or adjusted under 35 U.S.C. 154(b) by 0 days.

(21) Appl. No.: 16/189,350

(22) Filed: Nov. 13, 2018

(65) Prior Publication Data

US 2019/0144303 A1    May 16, 2019

Related U.S. Application Data

(60) Provisional application No. 62/586,382, filed on Nov. 15, 2017.

(51) Int. Cl.
*C02F 1/14* (2006.01)
*F24S 20/30* (2018.01)
(Continued)

(52) U.S. Cl.
CPC ............ *C02F 1/14* (2013.01); *C02F 1/043* (2013.01); *C10L 5/10* (2013.01); *C10L 5/14* (2013.01);
(Continued)

(58) Field of Classification Search
CPC ...... C02F 1/14; C02F 1/043; C02F 2103/833; C10L 5/46; C10L 5/10; C10L 5/445;
(Continued)

(56) References Cited

U.S. PATENT DOCUMENTS

| 3,487,015 A | * | 12/1969 | Boester | .................... C02F 3/30 |
| | | | | 210/612 |
| 5,891,330 A | * | 4/1999 | Morris | ................. B61D 35/007 |
| | | | | 210/104 |
| 2017/0101596 A1 | | 4/2017 | Woods et al. | |

FOREIGN PATENT DOCUMENTS

| KR | 10-2013-0095469 A | 8/2013 |
| KR | 10-1773747 B1 | 8/2017 |
| WO | WO-2013/168981 A1 | 11/2013 |

OTHER PUBLICATIONS

International Searching Authority, International Search Report and Written Opinion for International Application No. PCT/US2018/060772, Apr. 24, 2019, 11 pages, Korean Intellectual Property Office, Korea.
(Continued)

*Primary Examiner* — Cephia D Toomer
(74) *Attorney, Agent, or Firm* — Alston & Bird LLP

(57) ABSTRACT

A continuous flow treatment apparatus comprises a heating fluid management portion and a feces treatment portion. The heating fluid management portion is configured to heat heating fluid and provide the heated heating fluid to a heat exchanger. The feces treatment portion comprises the heat exchanger. The heat exchanger is configured to receive feces at a first position of the heat exchanger, indirectly heat the feces via the heated heating fluid as the feces are transported from the first position to a second position of the heat exchanger, and provide the heated feces at the second position. The feces are maintained at a minimum temperature for a predetermined amount of time such that the feces exiting the feces treatment portion have been rendered sanitary for at least one of storage or further processing.

19 Claims, 29 Drawing Sheets

(51) Int. Cl.
    *F24S 23/71*     (2018.01)
    *F24S 60/30*     (2018.01)
    *C10L 5/46*     (2006.01)
    *C10L 5/10*     (2006.01)
    *C02F 1/04*     (2006.01)
    *C10L 5/44*     (2006.01)
    *C10L 5/14*     (2006.01)
    *C10L 5/36*     (2006.01)
    *C10L 9/08*     (2006.01)
    *C10L 5/40*     (2006.01)
    *F24S 23/70*     (2018.01)
    *C02F 103/00*     (2006.01)
    *C10L 5/42*     (2006.01)

(52) U.S. Cl.
CPC ................. *C10L 5/361* (2013.01); *C10L 5/40* (2013.01); *C10L 5/445* (2013.01); *C10L 5/46* (2013.01); *C10L 9/08* (2013.01); *F24S 20/30* (2018.05); *F24S 23/71* (2018.05); *F24S 60/30* (2018.05); *C02F 2103/005* (2013.01); *C10L 5/42* (2013.01); *C10L 5/447* (2013.01); *C10L 2290/06* (2013.01); *C10L 2290/24* (2013.01); *C10L 2290/30* (2013.01); *C10L 2290/36* (2013.01); *C10L 2290/50* (2013.01); *F24S 2023/833* (2018.05)

(58) Field of Classification Search
CPC .... C10L 5/14; C10L 5/361; C10L 9/08; C10L 5/40; C10L 5/42; C10L 2290/30; C10L 2290/06; C10L 2290/50; C10L 2290/24; C10L 2290/36; F24S 20/30; F24S 60/30; F24S 23/71; F24S 2023/833
See application file for complete search history.

(56) References Cited

OTHER PUBLICATIONS

Andrew Silver, *Kenyan Startup Uses the Sun to Turn Human Waste Into Cooking Fuel*, IEEE Spectrum, Nov. 23, 2016, [article, online], [retrieved May 30, 2019], retrieved from the Internet <URL: https://spectrum.ieee.org/energywise/energy/environment/kenyan-startup-uses-the-sun-to-turn-human-waste-into-cooking-fuel> (3 pages).

* cited by examiner

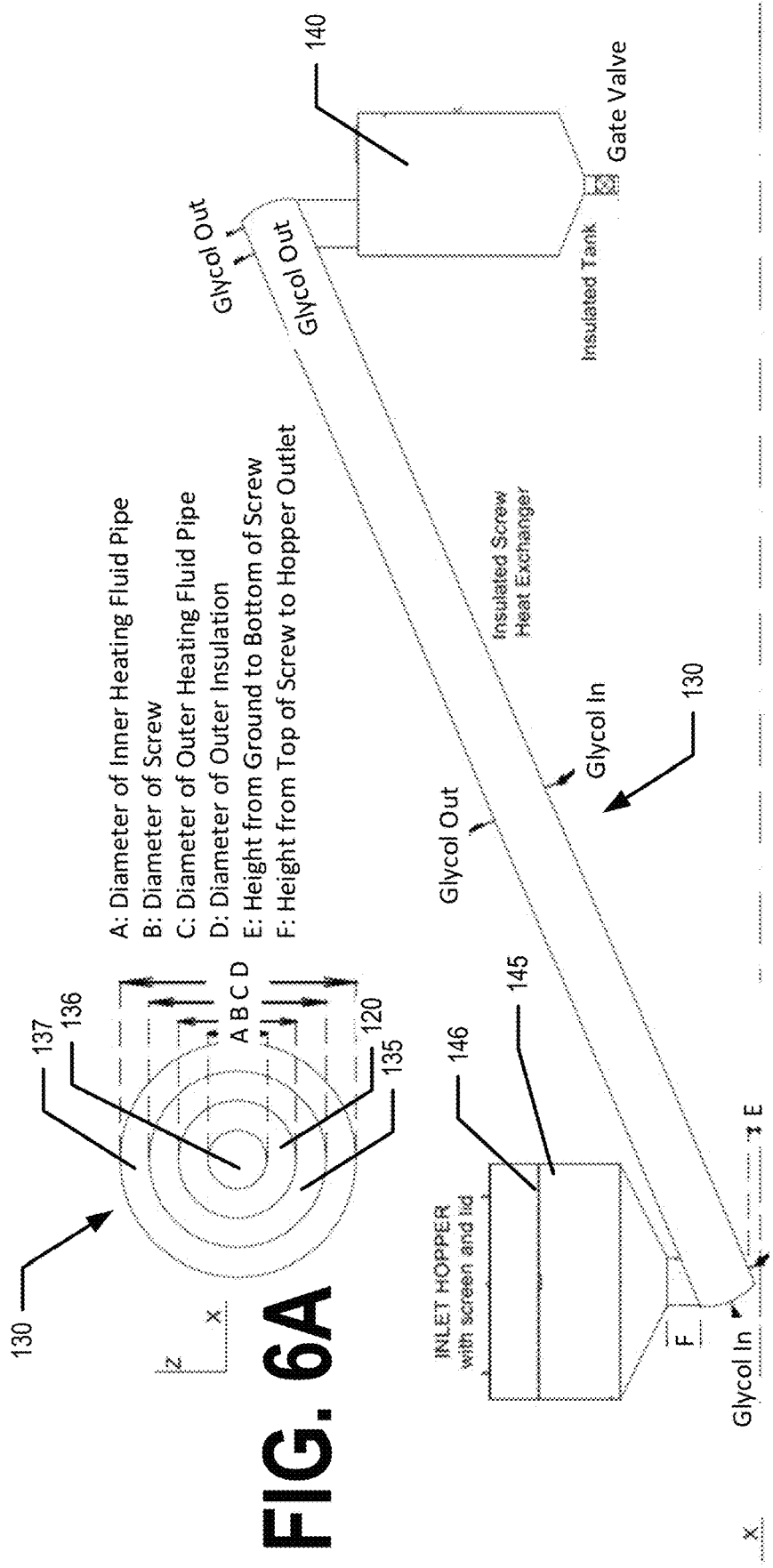

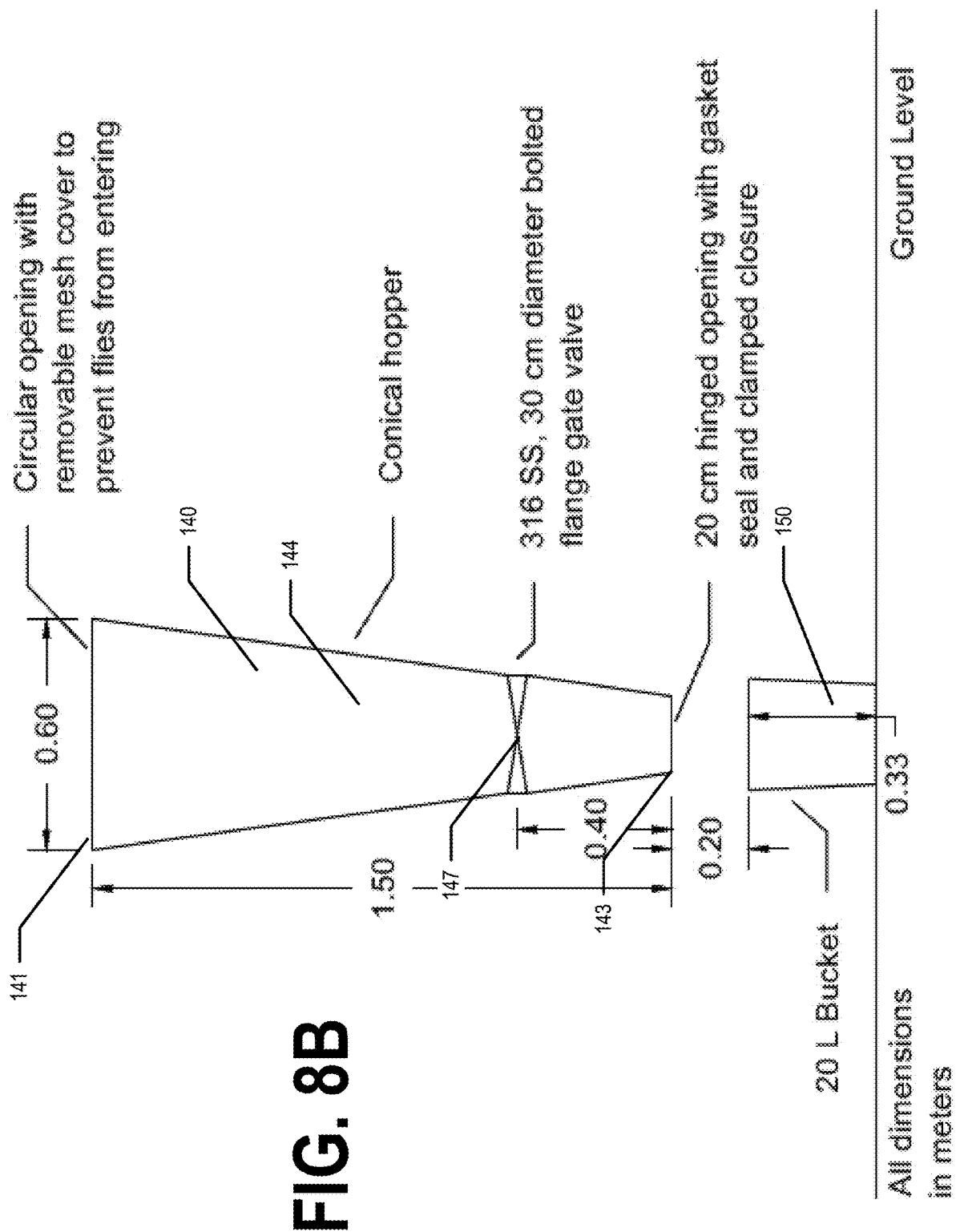

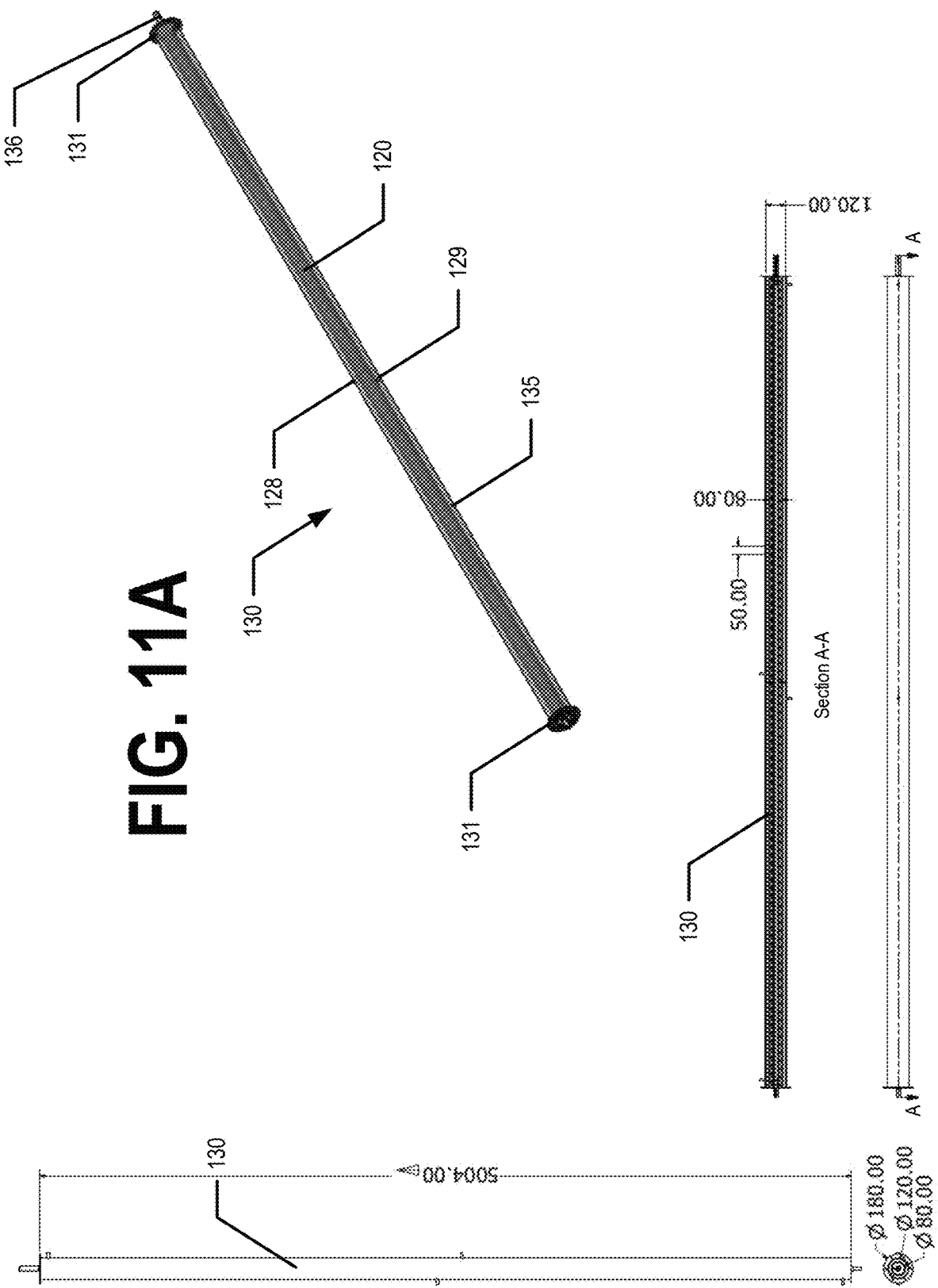

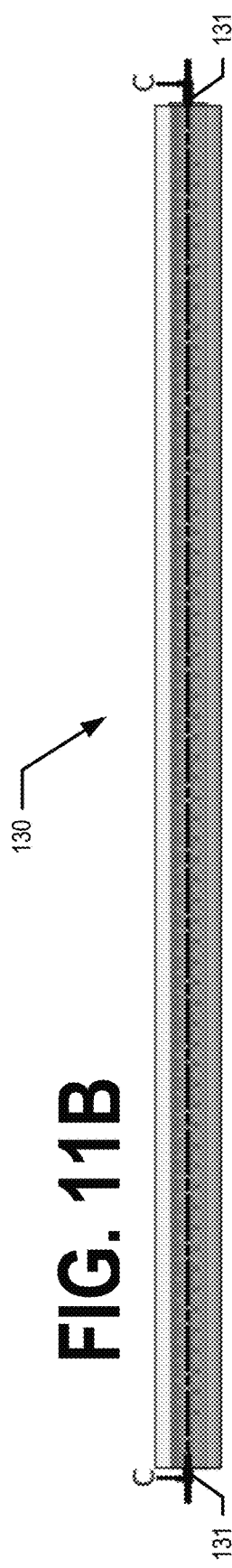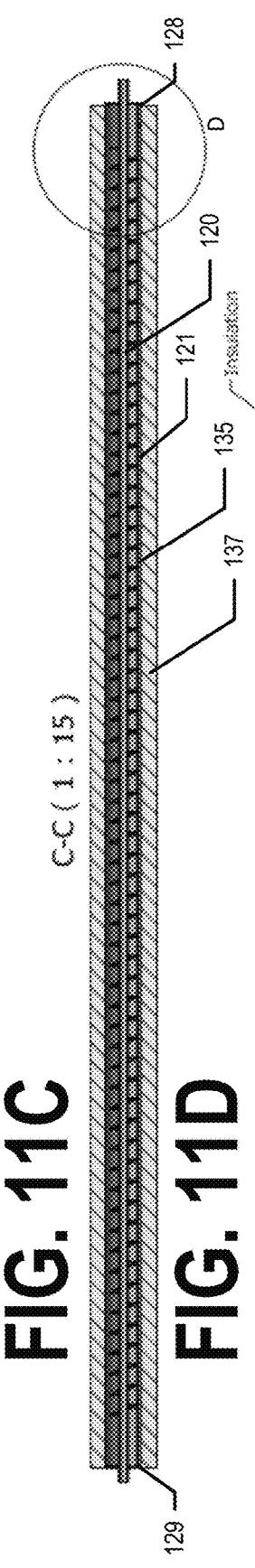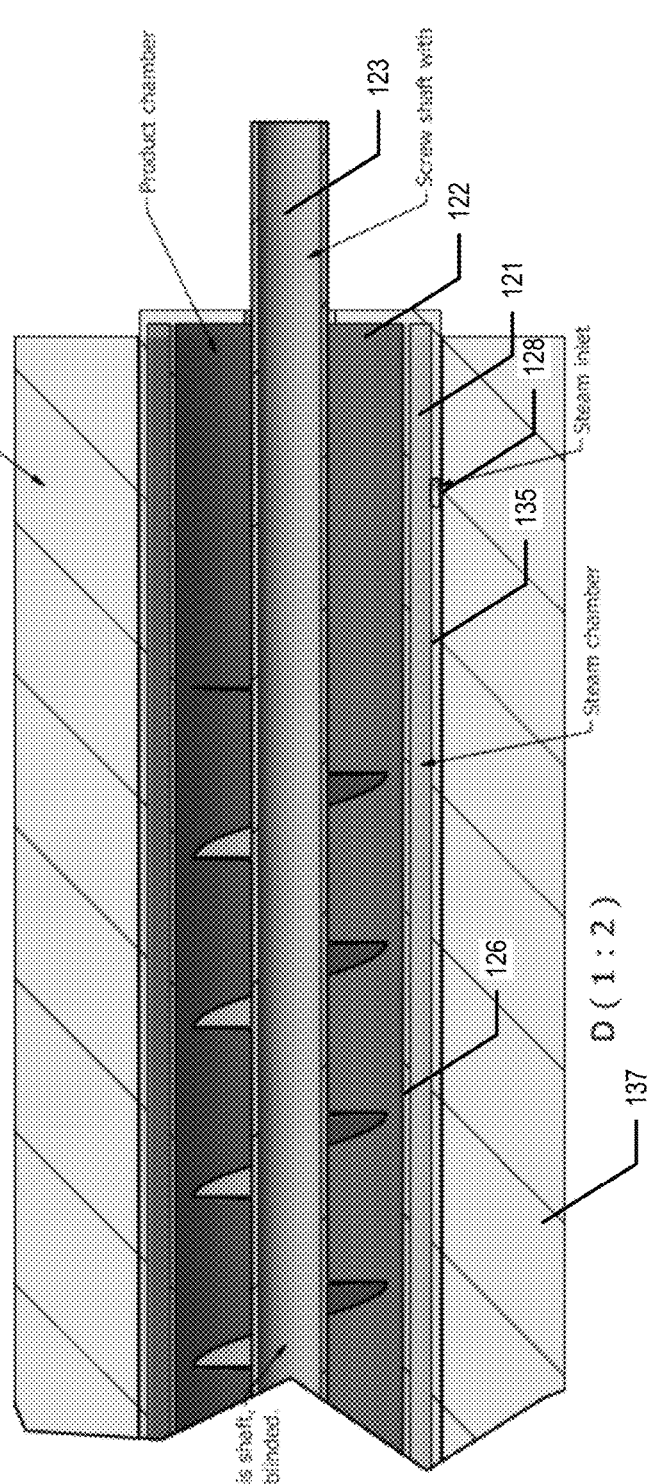
FIG. 11B
FIG. 11C
FIG. 11D

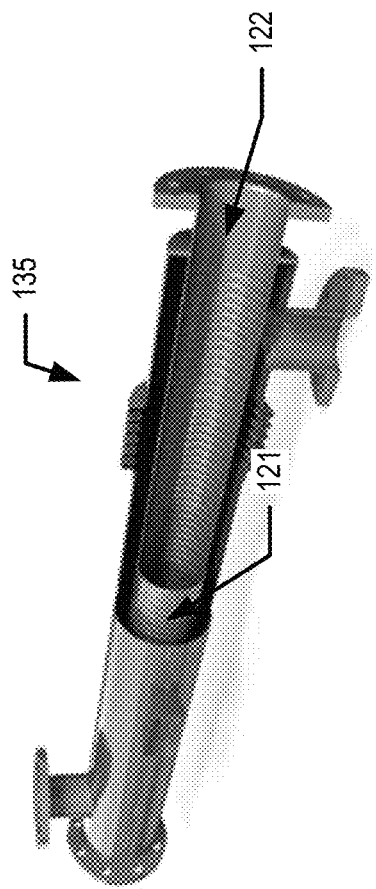
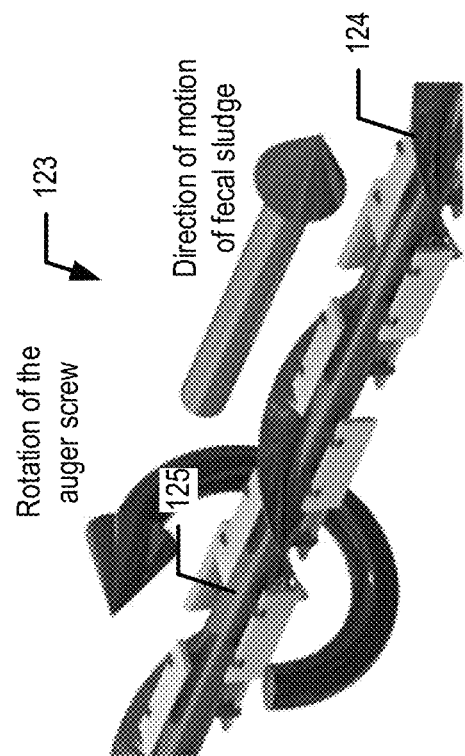
FIG. 12A
FIG. 12B

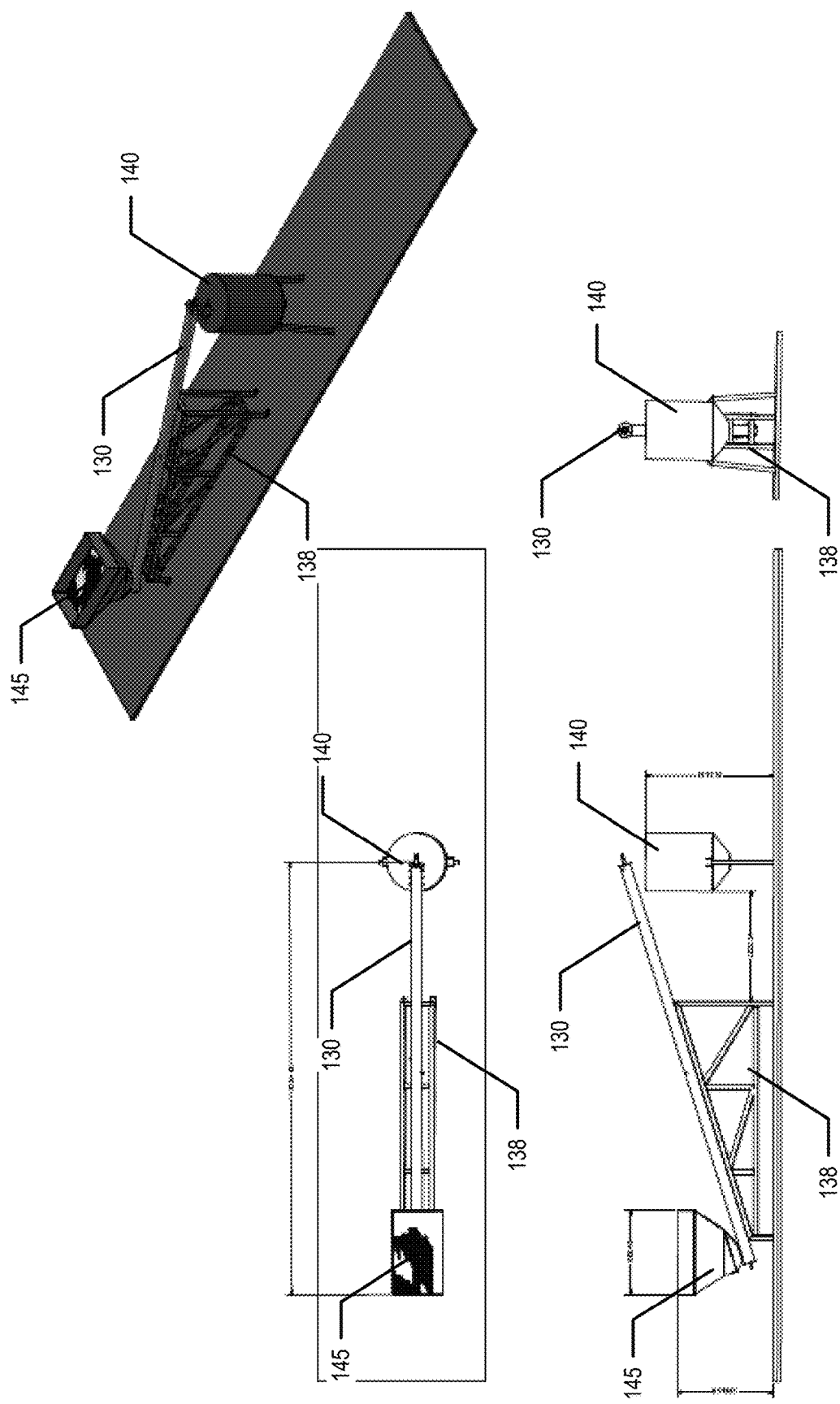

| Heat Exchanger Dimensions 230 | | |
|---|---|---|
| Length | 5.8 | m |
| Faeces flow rate (max) | 105 | kg/h |
| Pipe Thickness | 0.0046 | m (Sch40) |

| Inlet Hopper 245 | | | |
|---|---|---|---|
| Description | Symbol | Unit | Value |
| Total Volume Required | $V_{IH,tot,req}$ | $m^3$ | 1.00 |
| Cube Volume | $V_{IH,cube}$ | $m^3$ | 0.80 |
| Cube Height | $H_{IH,cube}$ | m | 0.5 |
| Cube Width | $W_{IH,cube}$ | m | 1.2 |
| Cube Length | $L_{IH,cube}$ | m | 1.33 |
| Hopper Bottom Volume | $V_{IH,bot}$ | $m^3$ | 0.20 |

FIG. 21A

| Inlet Hopper | 245 | | |
|---|---|---|---|
| Hopper Bottom Angle | $\theta_{lh,bot}$ | ° | 22.50 |
| Hopper Bottom Height | $H_{lh,bot}$ | m | 0.37 |
| Hopper Bottom Width | $W_{lh,bot}$ | m | 1.2 |
| Hopper Bottom Length | $L_{lh,bot}$ | m | 1.33 |
| Total Volume Hopper plus Cube Actual | $V_{lh,tot,act}$ | $m^3$ | 1.00 |
| Total Height Actual | $H_{lh,tot,act}$ | m | 0.87 |
| Total Width | $W_{lh,cube}$ | m | 1.2 |
| Total Length | $L_{lh,cube}$ | m | 1.33 |

| Insulated Storage Tank | 240 | | |
|---|---|---|---|
| Description | Symbol | Unit | Value |
| Total Volume Required | $V_{st,tot,req}$ | $m^3$ | 1.00 |
| Total Height Maximum | $H_{st,tot,req}$ | m | 2 |
| Cylinder Volume | $V_{st,cyl}$ | $m^3$ | 0.90 |
| Cylinder Height | $H_{st,cyl}$ | m | 1.14592 |
| Cylinder Diameter | $D_{st,cyl}$ | m | 1 |
| Hopper Bottom Volume | $V_{st,bot}$ | $m^3$ | 0.07 |
| Hopper Bottom Angle | $\theta_{st,bot}$ | ° | 22.50 |
| Hopper Bottom Height | $H_{st,bot}$ | m | 0.28 |
| Hopper Bottom Diameter | $D_{st,bot}$ | m | 1 |
| Total Volume Hopper plus Cube Actual | $V_{lh,tot,act}$ | $m^3$ | 0.97 |
| Total Height Actual | $H_{lh,tot,act}$ | m | 1.42 |

FIG. 21B

Generator 1

| Tag | Description | Quantity | Power | Total Power W | Voltage V | Current A |
|---|---|---|---|---|---|---|
| GW1 | Grinding Wheel 270 | 1 | 4000 | 4000 | 415 | 9.64 |
| RP1 | Roller Press 250 | 1 | 7500 | 7500 | 415 | 18.07 |
| CB1 | Conveyor Belt 260 | 1 | 1500 | 1500 | 415 | 3.61 |
| HE1 | Heating Element 213 | 1 | 6000 | 6000 | 415 | 14.46 |
| MR1 | Heat Exchanger Motor 218 | 1 | 2000 | 2000 | 415 | 4.82 |
| | MAXIMUM DRAW | | 21000 | | | 50.60 |

Generator 2

| Tag | Description | Quantity | Power | Total Power W | Voltage V | Current A |
|---|---|---|---|---|---|---|
| PM1 | Circulating Pump 216 | 1 | 150 | 150 | 240 | 0.63 |
| LX1 | Lighting | 4 | 100 | 400 | 240 | 1.67 |
| OL1 | Outlets | 4 | 100 | 400 | 240 | 1.67 |
| PLC1 | Controller | 1 | 100 | 100 | 12 | 0.15 |
| | MAXIMUM DRAW | | 1050 | | | 4.11 |

FIG. 21C

CONTINUOUS FLOW METHODS AND APPARATUSES FOR PROCESSING HUMAN WASTE

CROSS REFERENCE TO RELATED APPLICATIONS

This application claims priority to and the benefit of U.S. Provisional Patent Application No. 62/586,382, filed Nov. 15, 2017, the contents of which are hereby incorporated by reference in its entirety.

BACKGROUND

Many communities throughout the world have very little infrastructure in place for the safe and sanitary handling of human waste. As a result, these communities are subject to a variety of health hazards associated with human waste as well as the general noxious nature of the waste. As such, there is a general need for apparatuses and methods that enable the safe and sanitary handling of human waste in a low-infrastructure environment. There is a further need for the recycling or disposal of such human waste in a safe and sanitary manner.

Additionally, many of the same communities that lack infrastructure for managing human waste also suffer from a lack of access to other resources, such as fuel. Accordingly, there is a need for apparatuses and methods that enable the generation of useable fuel sources from resources readily available in remote, underdeveloped areas.

BRIEF SUMMARY OF VARIOUS EMBODIMENTS

Various embodiments of the present invention relate to apparatuses and methods for the sanitary handling of human waste products. In particular, various embodiments of the present invention relate to apparatuses and methods for converting human waste products into useful products, such as fertilizer and fuel briquettes. Example embodiments relate to apparatuses and methods for continuous treatment of human waste products. Some example embodiments relate to apparatuses and methods for continuous treatment of human waste products and converting the treated human waste products into useful products, such as fuel briquettes.

According to a first aspect, a continuous flow treatment apparatus is provided. In an example embodiment, the continuous flow treatment apparatus comprises a heating fluid management portion and a feces treatment portion. The heating fluid management portion is configured to heat heating fluid and provide the heated heating fluid to a heat exchanger. The heat exchanger is configured to receive feces at a first position of the heat exchanger, indirectly heat the feces via the heated heating fluid as the feces are transported from the first position to a second position of the heat exchanger, and provide the heated feces at the second position. The feces are maintained at a minimum temperature for a predetermined amount of time such that the feces exiting the feces treatment portion have been rendered sanitary for at least one of storage or further processing.

According to another aspect of the present invention, a continuous flow treatment and briquette apparatus. In an example embodiment, the continuous flow treatment and briquette apparatus comprises a heating fluid management portion, a feces treatment portion, and a briquette producing portion. The heating fluid management portion is configured to heat heating fluid and provide the heated heating fluid to a heat exchanger. The feces treatment portion comprises the heat exchanger. The heat exchanger is configured to receive feces at a first position of the heat exchanger, indirectly heat the feces via the heated heating fluid as the feces are transported from the first position to a second position of the heat exchanger, and provide the heated feces at the second position. The feces are maintained at a minimum temperature for a predetermined amount of time such that the feces exiting the feces treatment portion have been rendered sanitary for at least one of storage or further processing. The briquette producing portion is configured to receive the feces that exited feces treatment portion and generate fuel briquettes comprising the received feces.

According to yet another aspect of the present invention, a method for treating human waste products, such as feces, is provided. In an example embodiment, the method comprises heating a heating fluid using at least a solar concentrator; providing the heated heating fluid to a heating fluid channel of a heat exchanger; providing feces to a feces channel at a first position of the heat exchanger; transporting the feces through the feces channel from the first position to a second position of the heat exchanger using a conveyance assembly such that the feces is heated to a minimum temperature for a predetermined amount of time as the feces are transported from the first position to the second position; and providing the feces from the second position of the heat exchanger. The feces exiting the heat exchanger at the second position has been rendered sanitary for at least one of storage or further processing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a high level diagram of a continuous flow treatment apparatus according to one embodiment;

FIG. 2 illustrates a block diagram of a continuous flow treatment apparatus according to one embodiment;

FIG. 3 provides a high level mass and energy flow diagram of a continuous flow treatment apparatus according to one embodiment;

FIG. 4 provides a process flow diagram of a continuous flow treatment apparatus according to one embodiment;

FIG. 6A is a cross-sectional view of an example feces conveyance assembly according to one embodiment;

FIG. 6B is a side view of a continuous flow treatment apparatus according to one embodiment;

Figure 1:
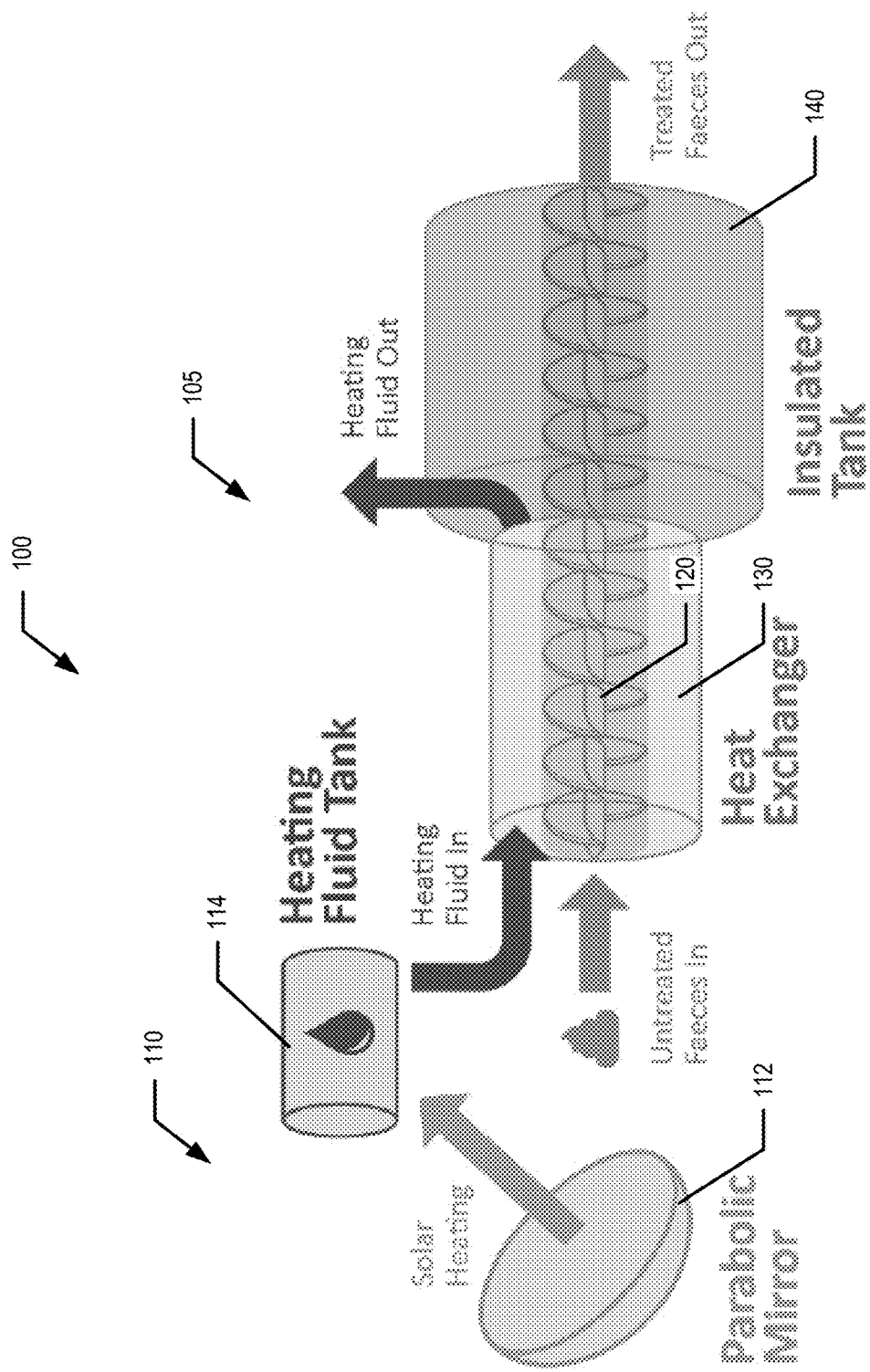
Figure 2:
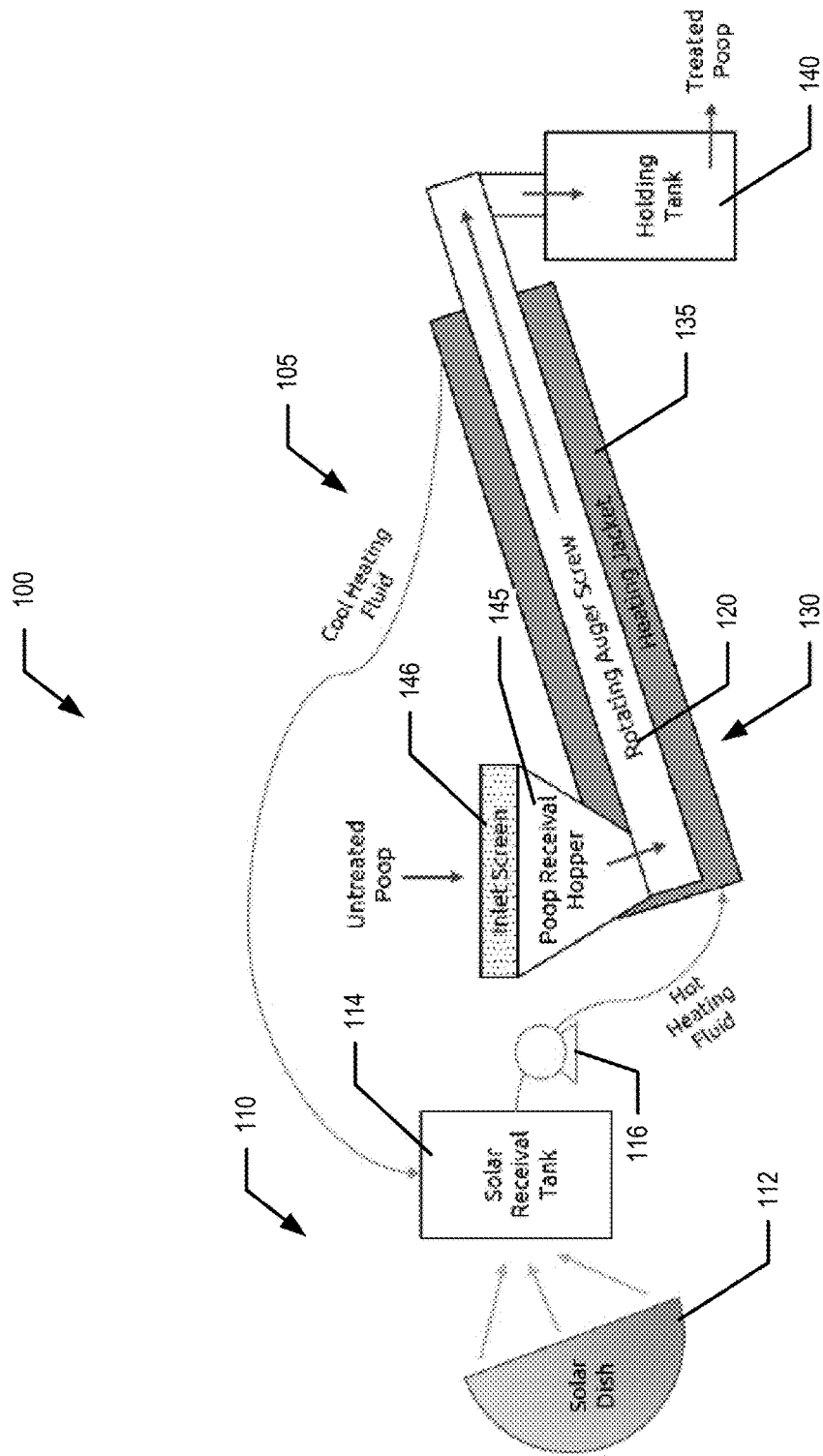
Figure 3:
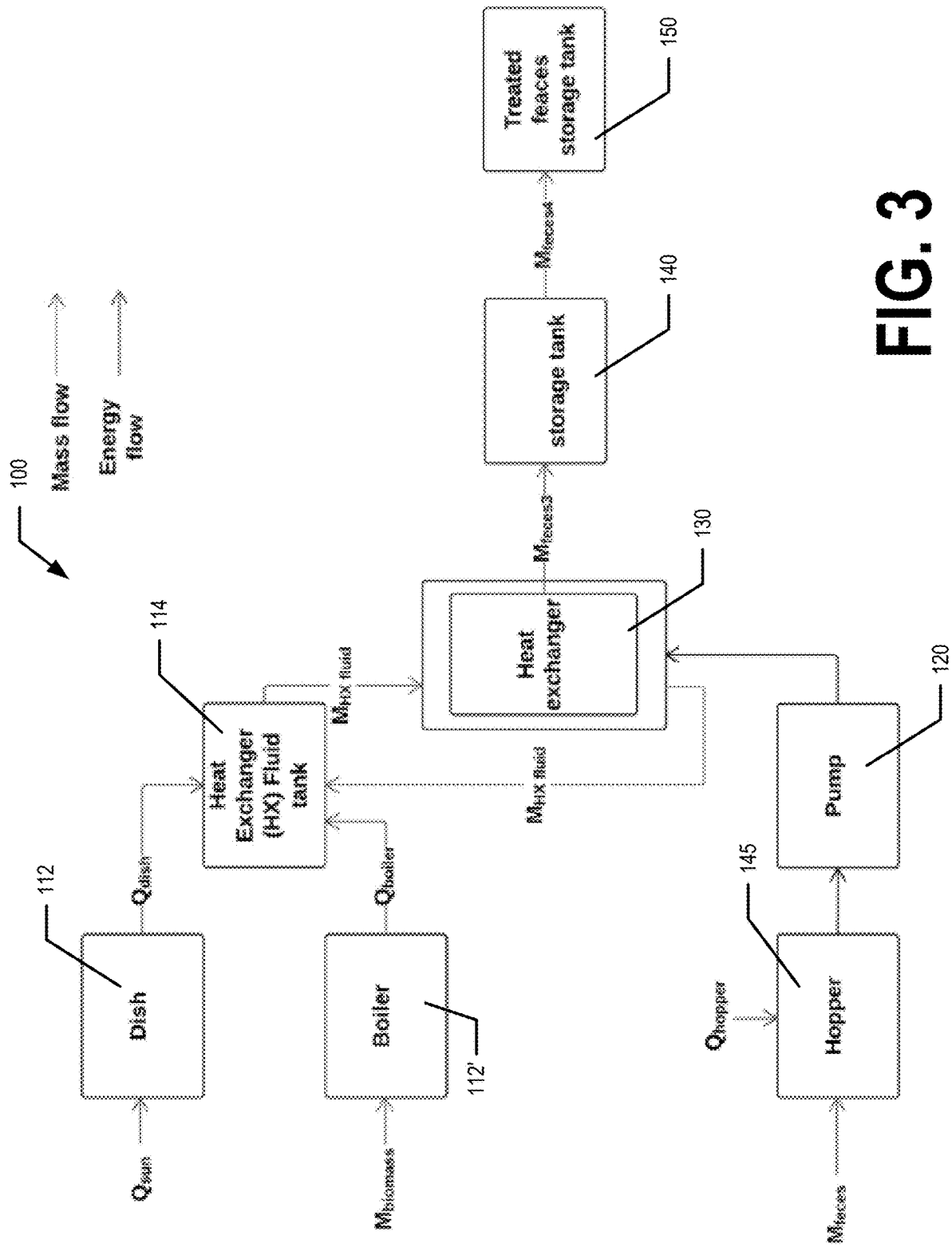
Figure 4:
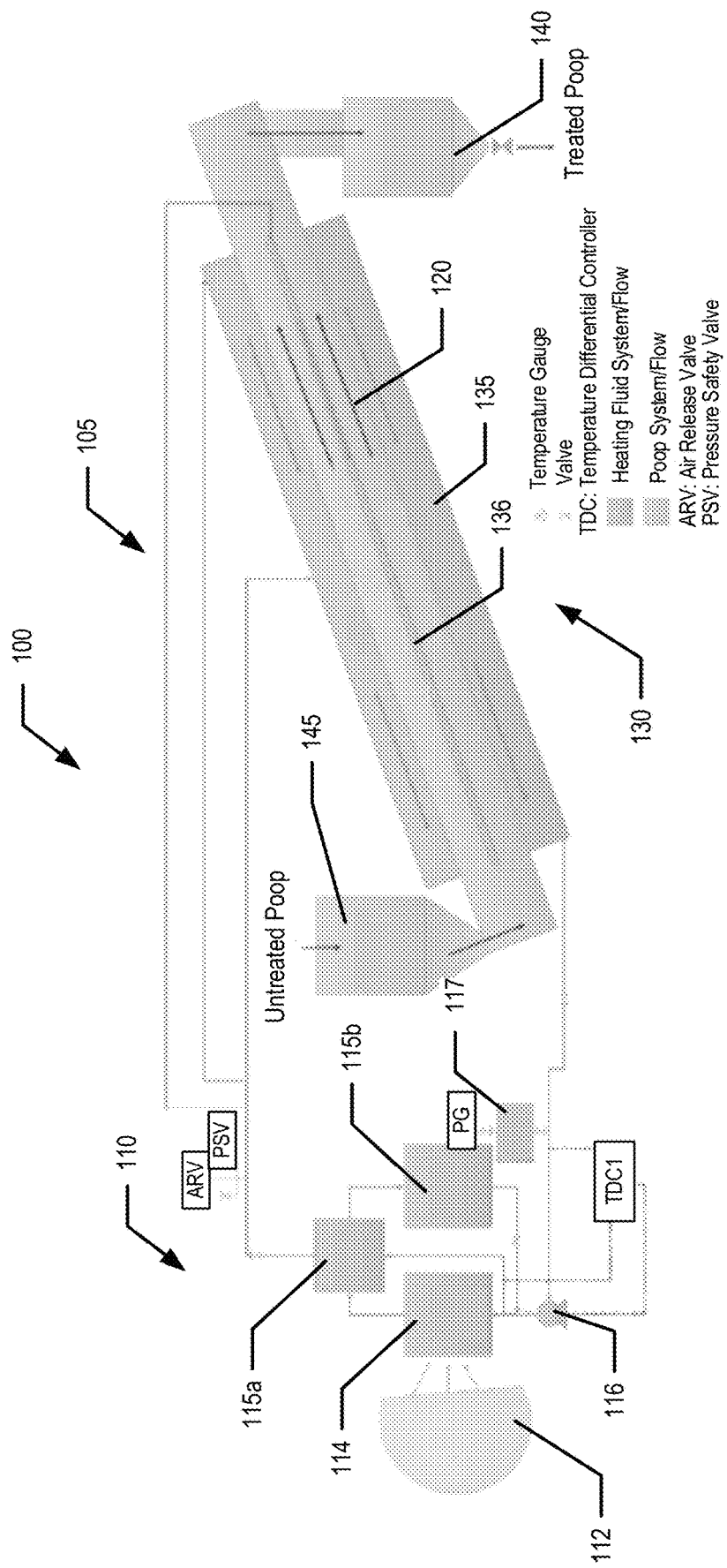
Figure 5:
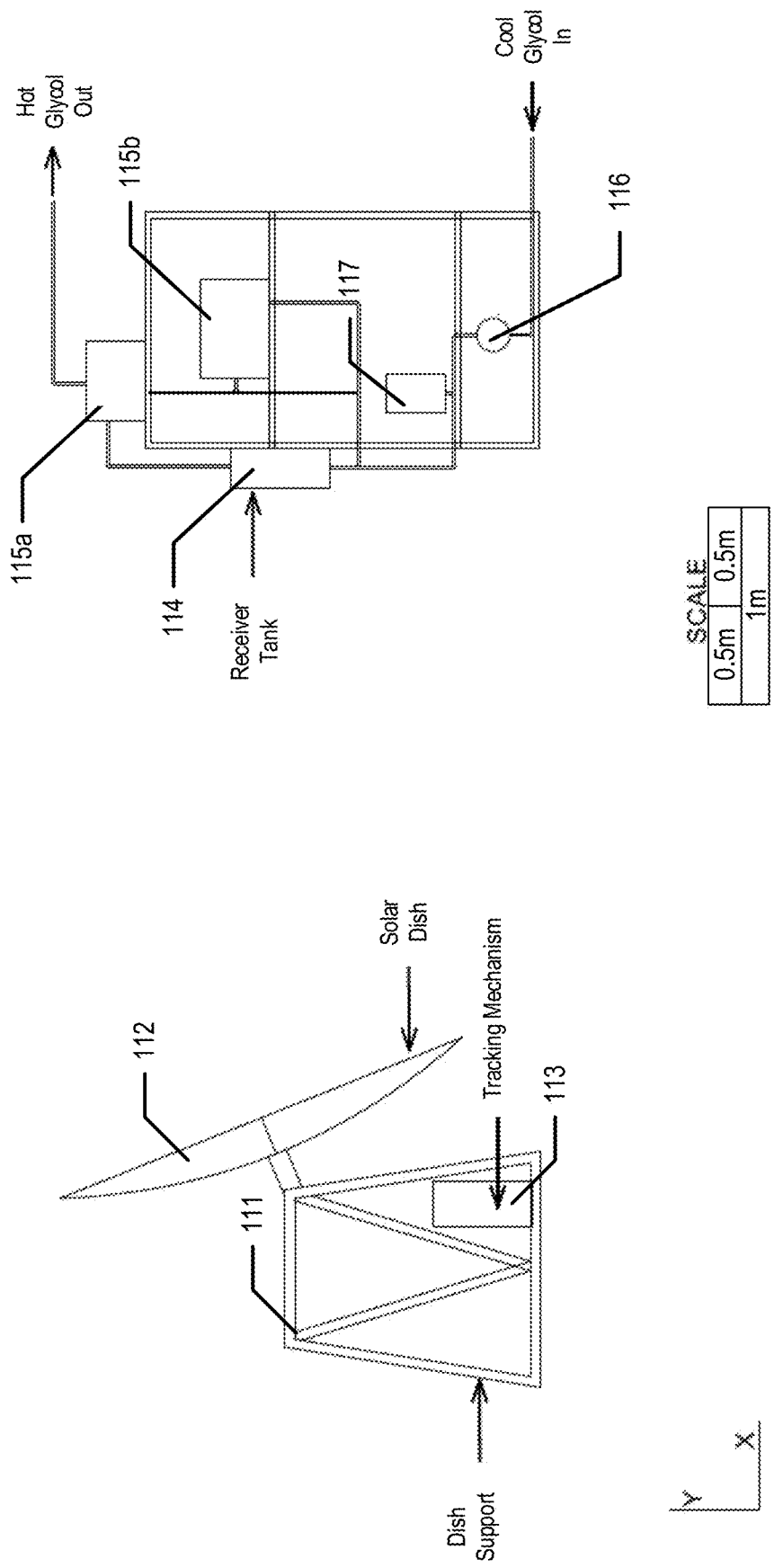
FIG. 5 is a side view of part of a heating fluid management portion of a continuous flow treatment apparatus according to one embodiment.
Figure 6D:
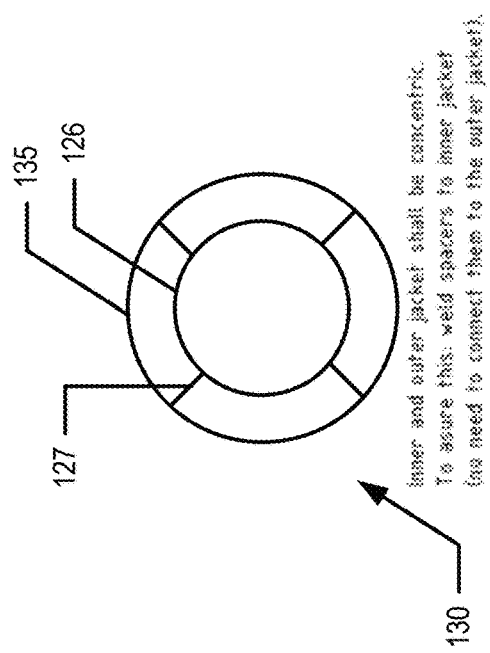
FIG. 6D is a cross-sectional view of the example continuous flow treatment apparatus according to the embodiment shown in FIG. 6C.
Figure 6C:
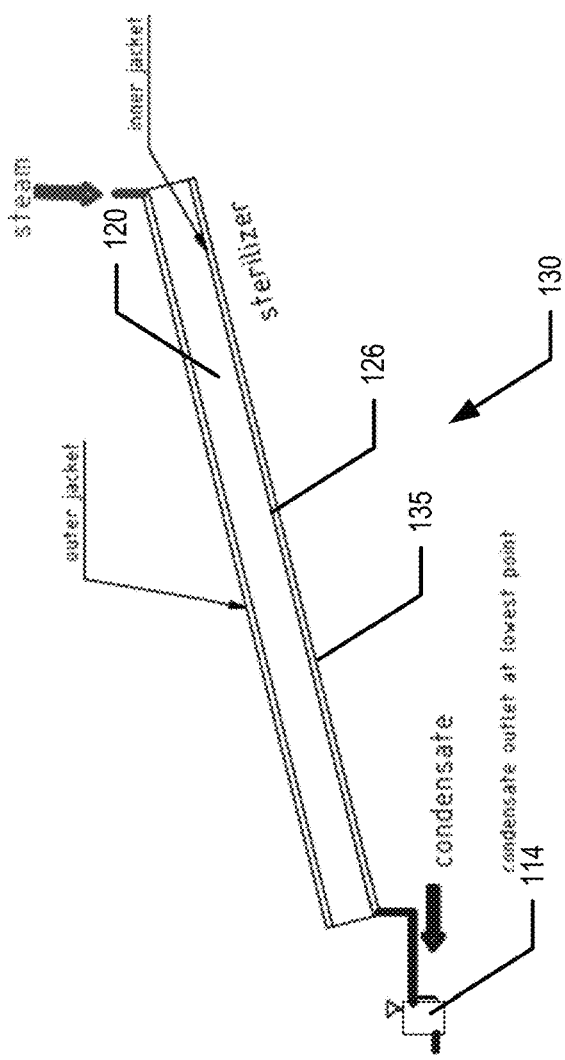
FIG. 6C is a cross-section of a side view of a continuous flow treatment apparatus according to another embodiment.
Figure 7:
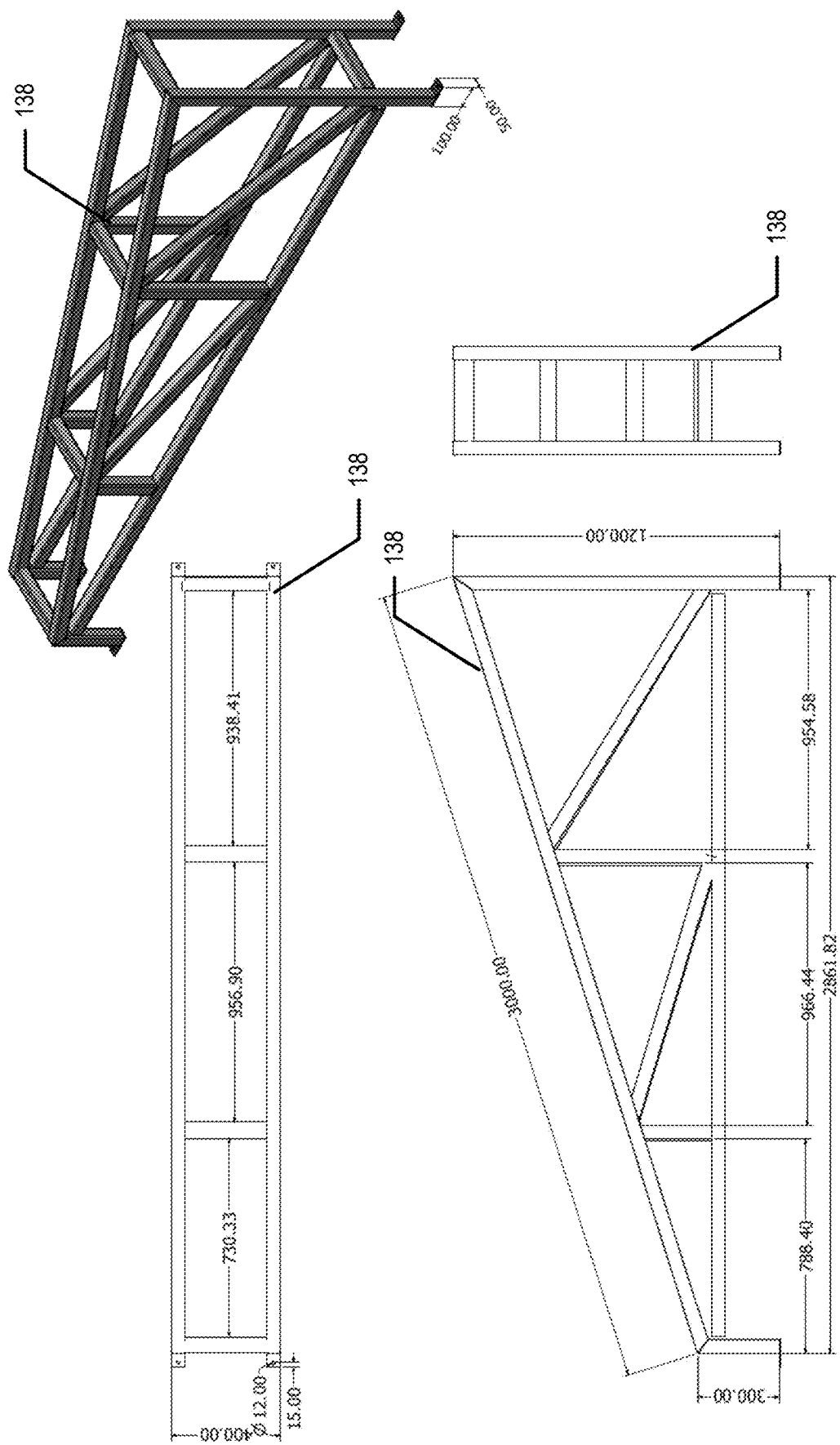
Figure 8A:
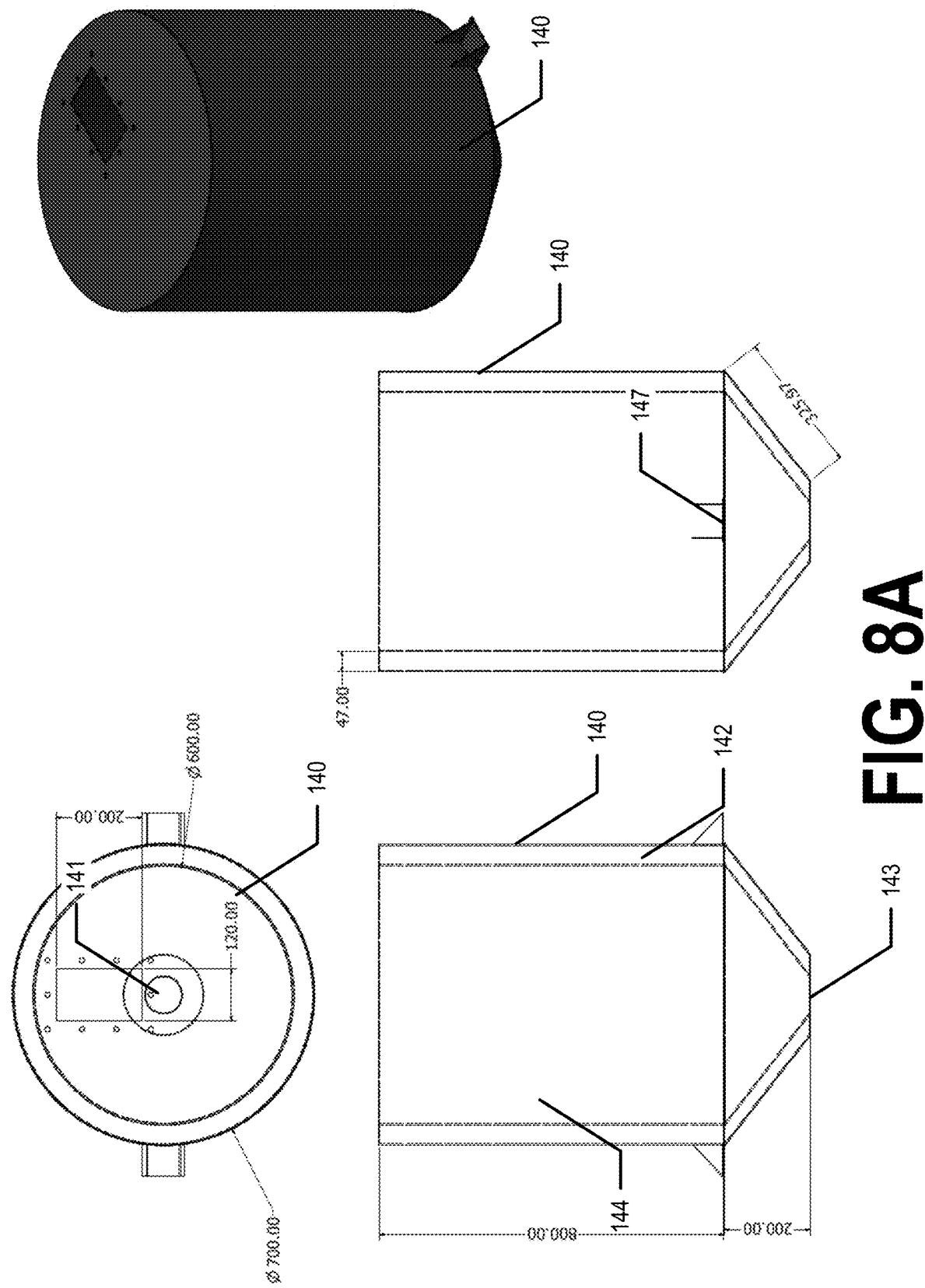
Figure 9:
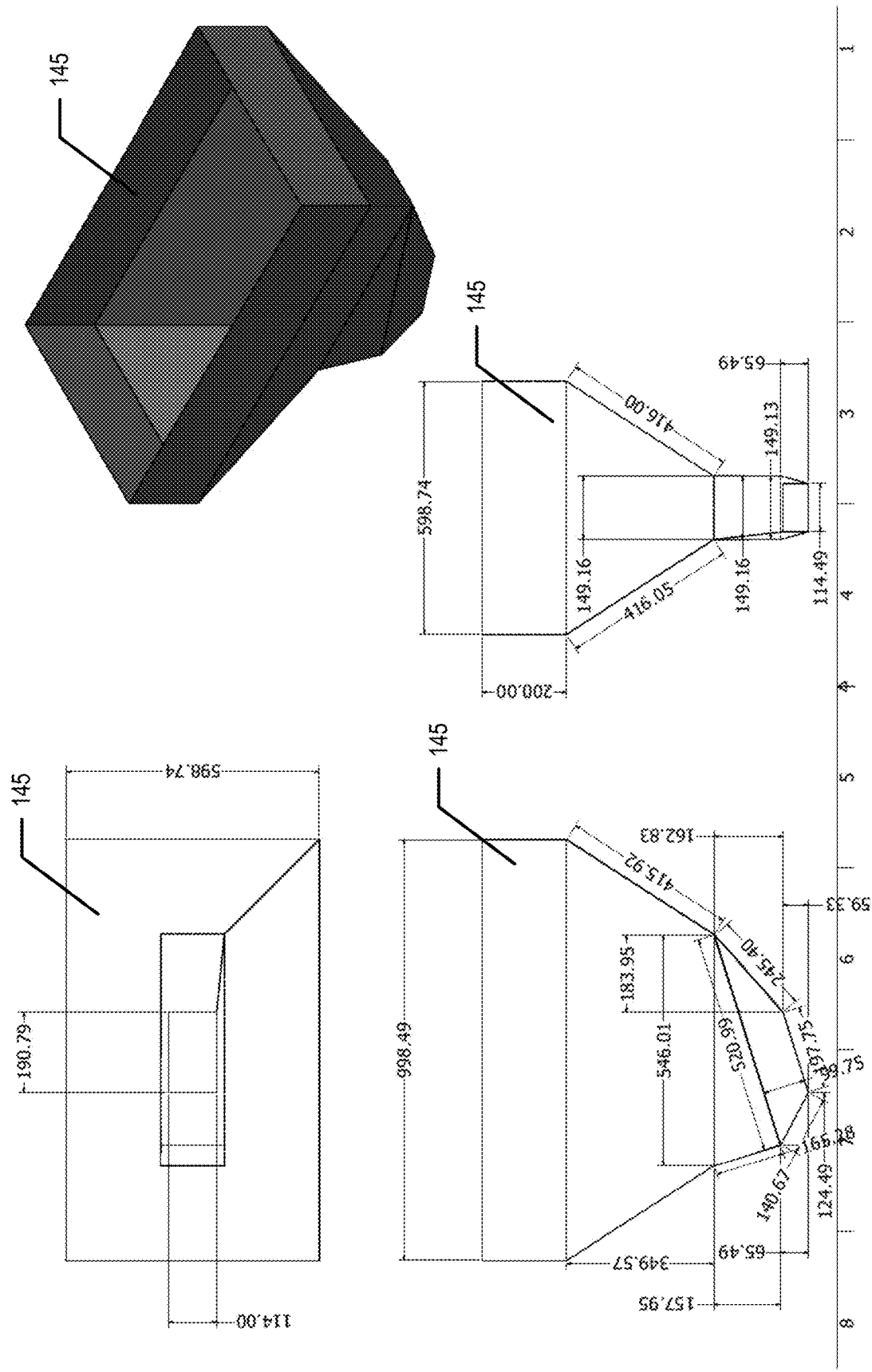
Figure 10:
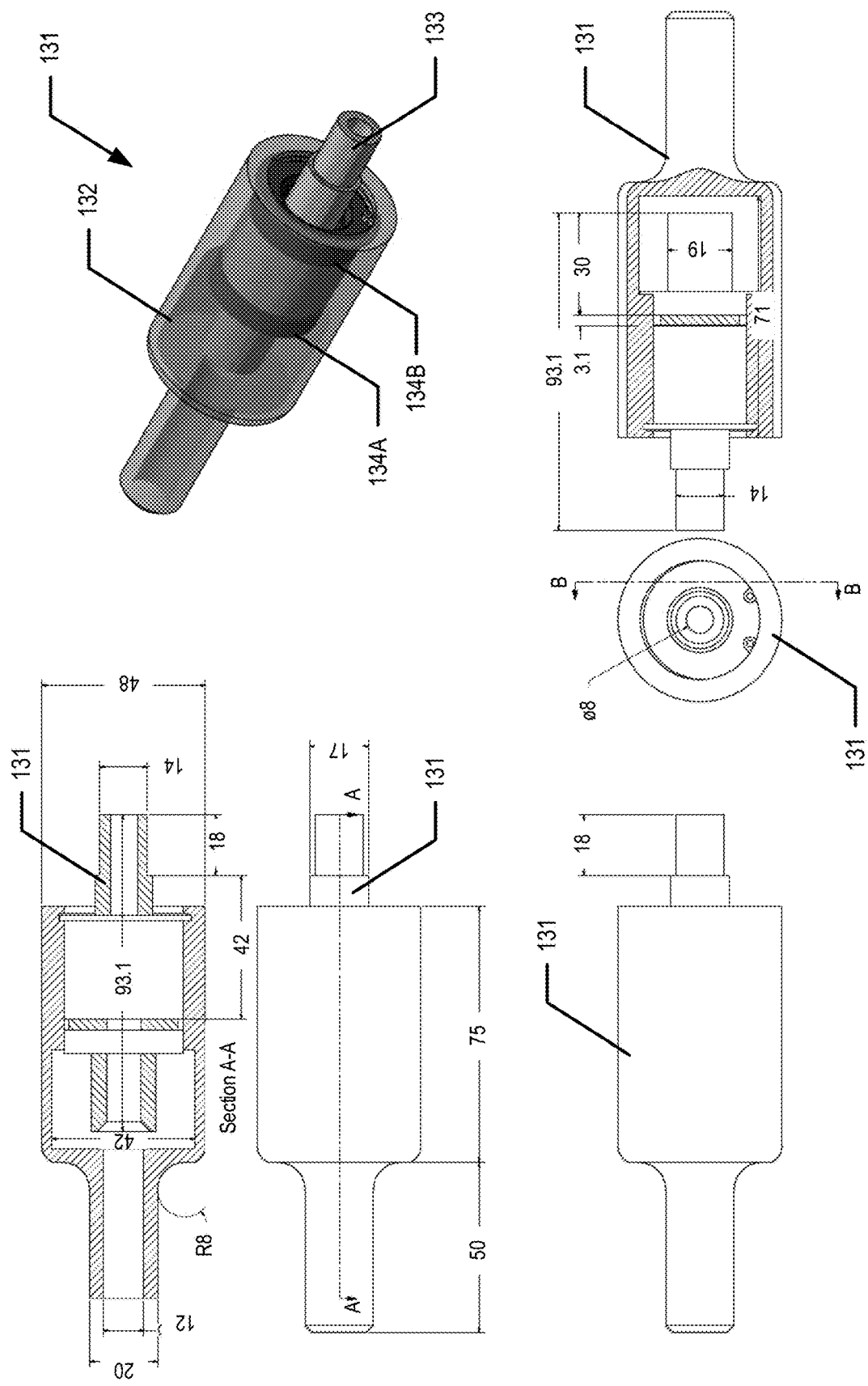
Figure 12C:
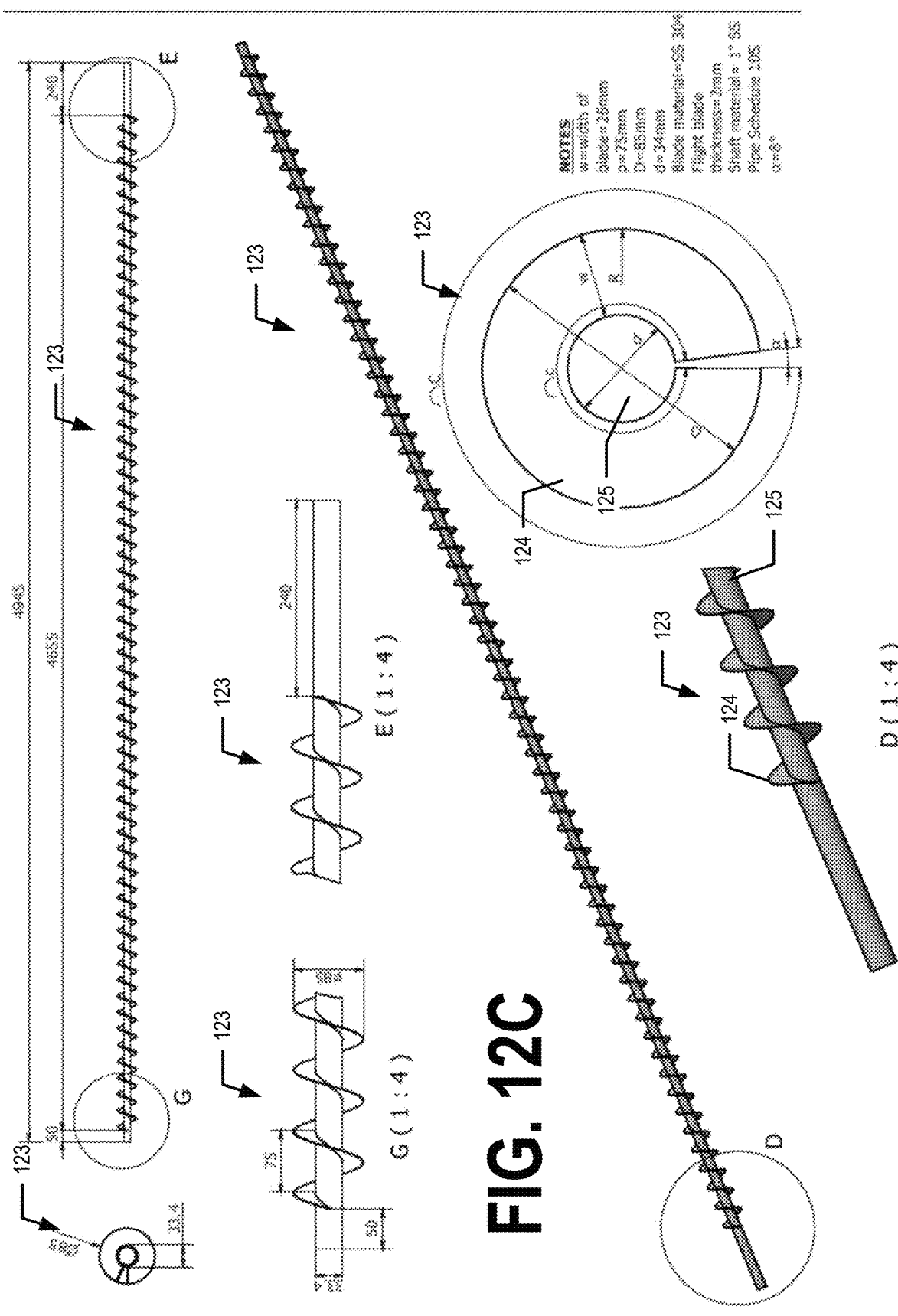
Figure 14A:
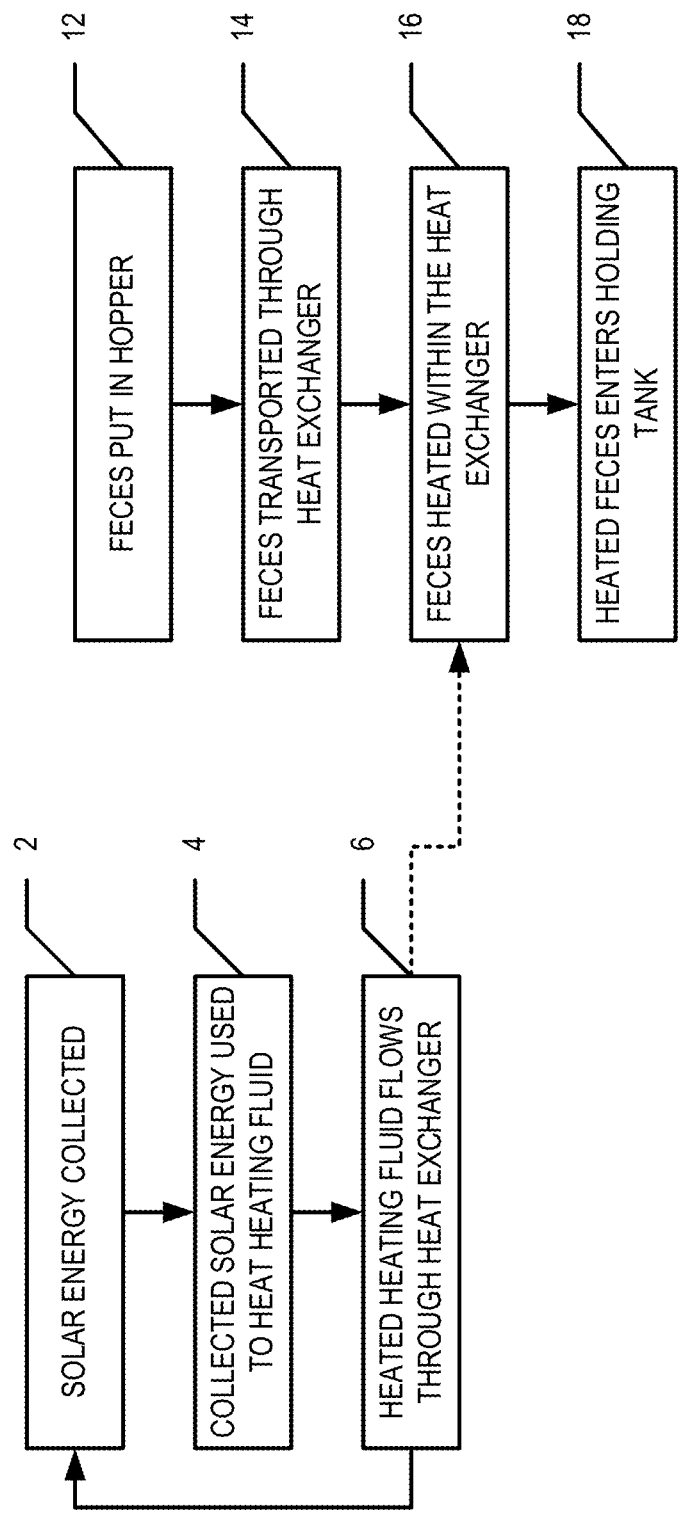
Figure 14B:
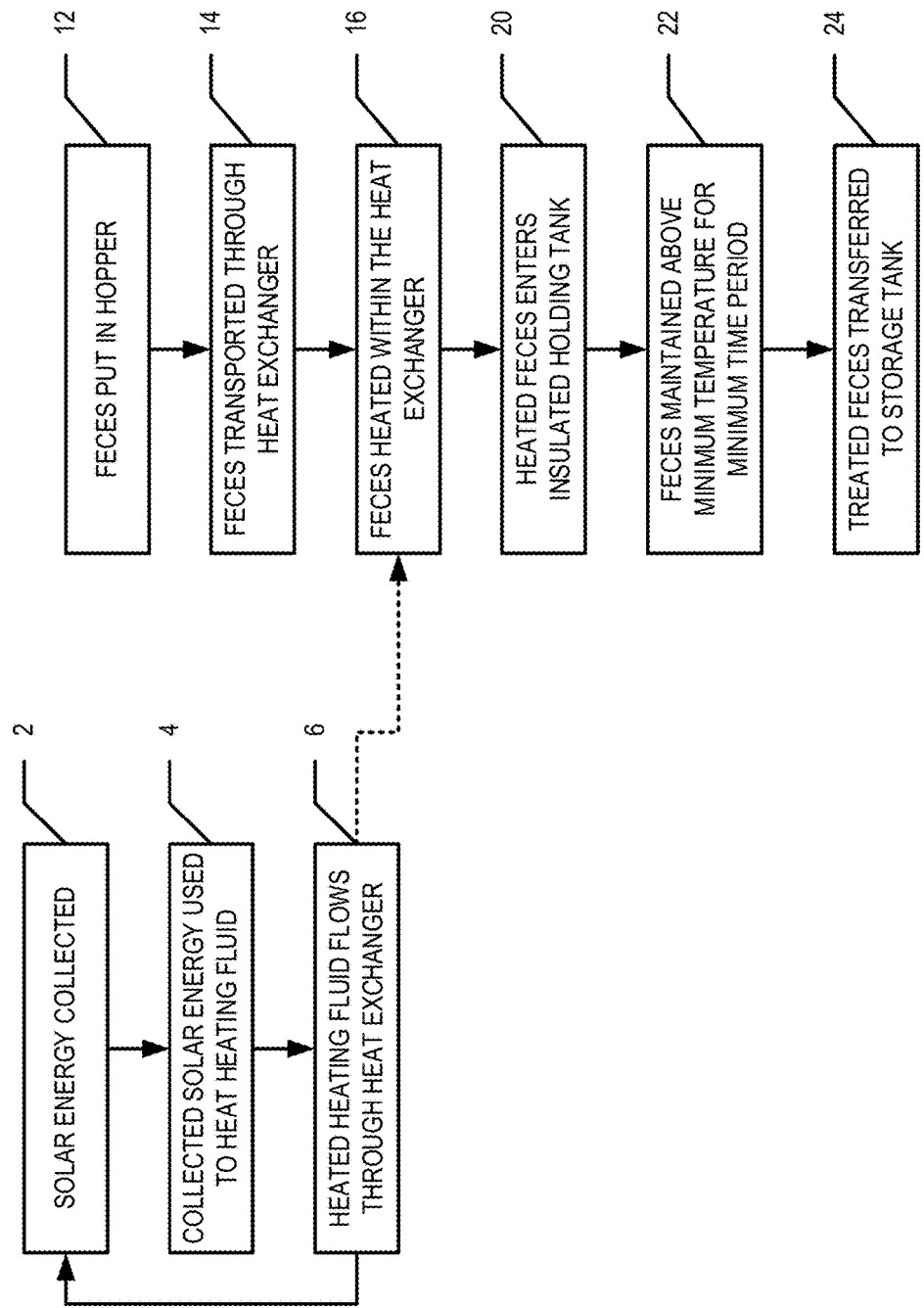
Figure 15:
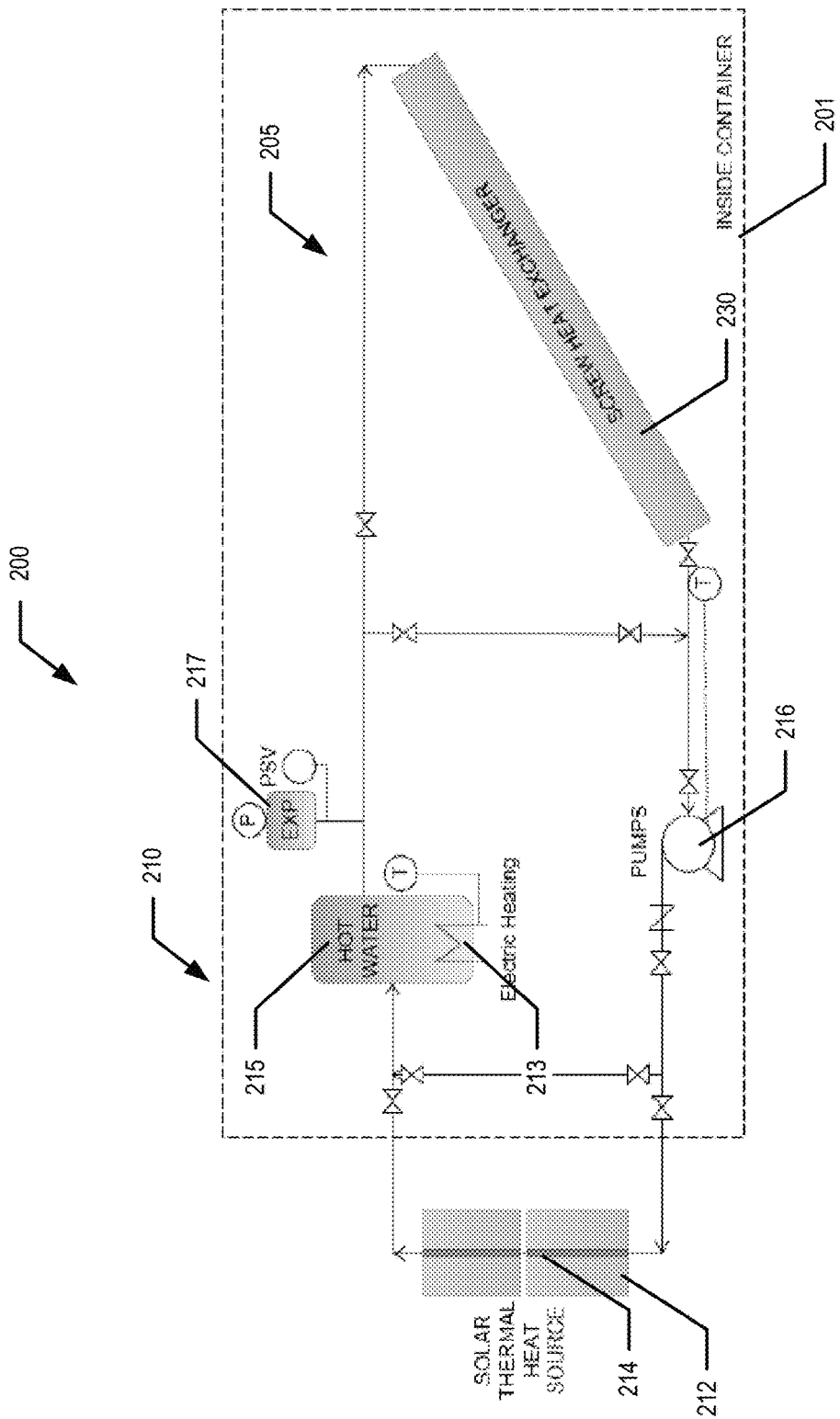
Figure 16:
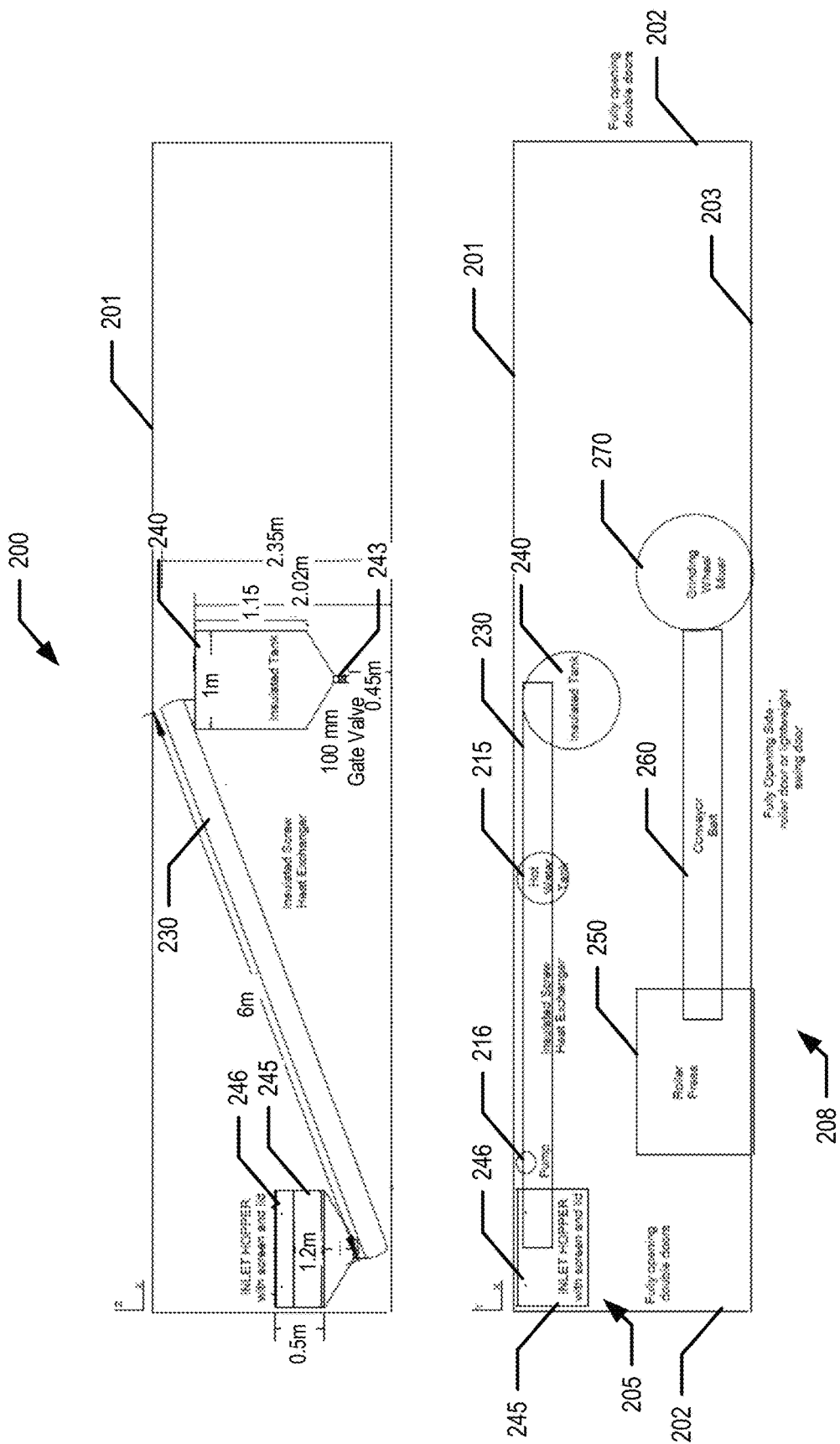
Figure 17:
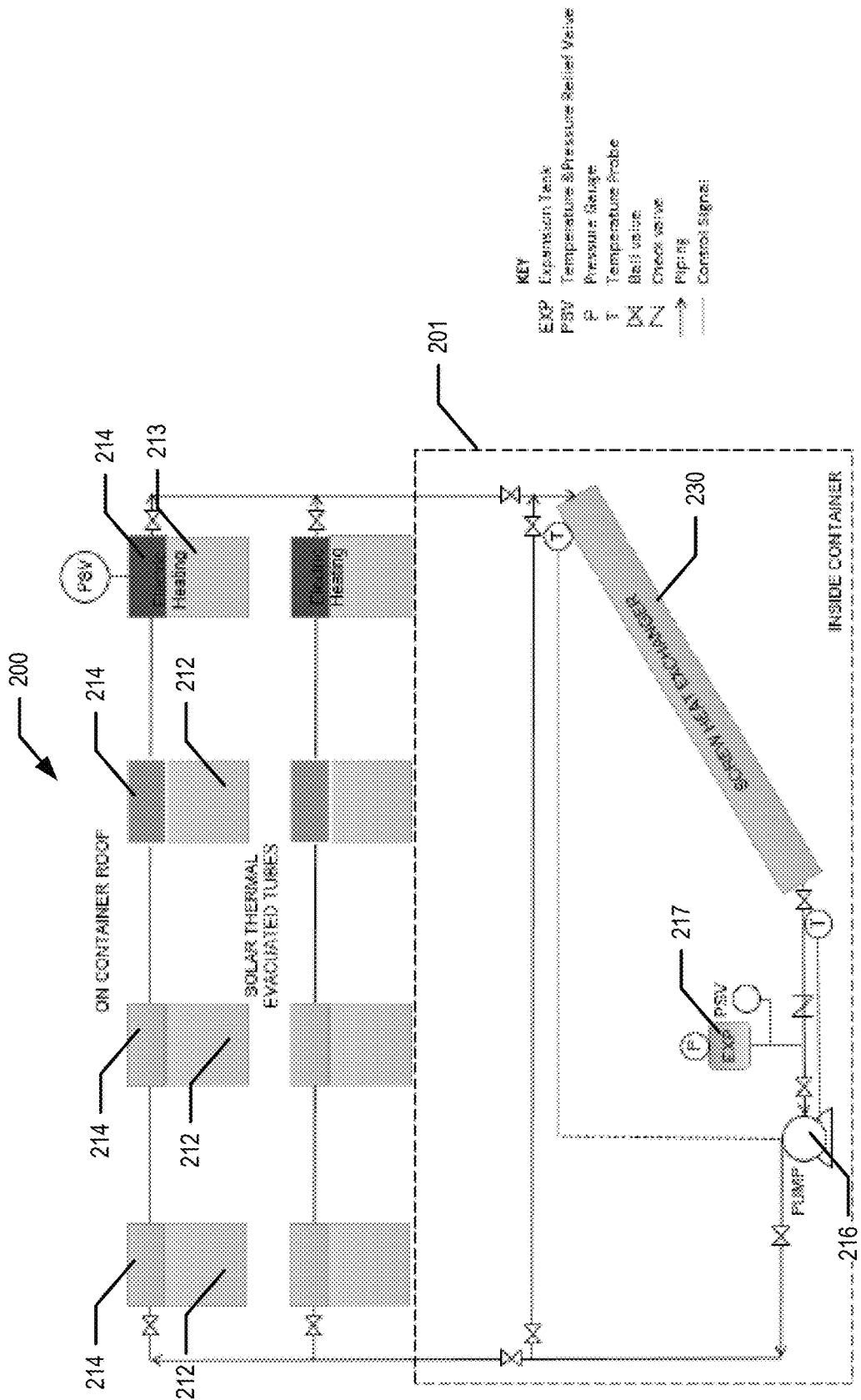
Figure 18:
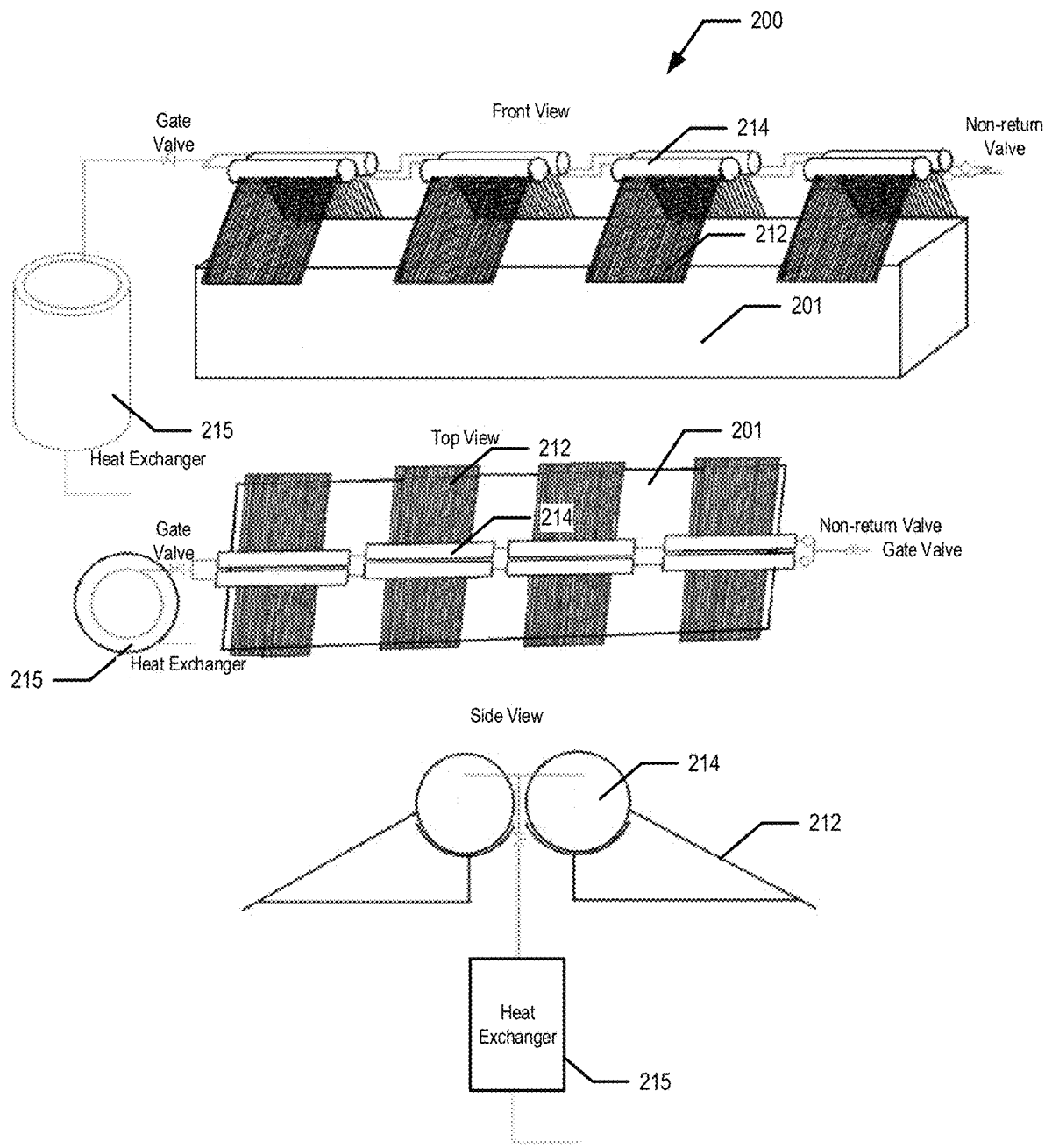
Figure 19:
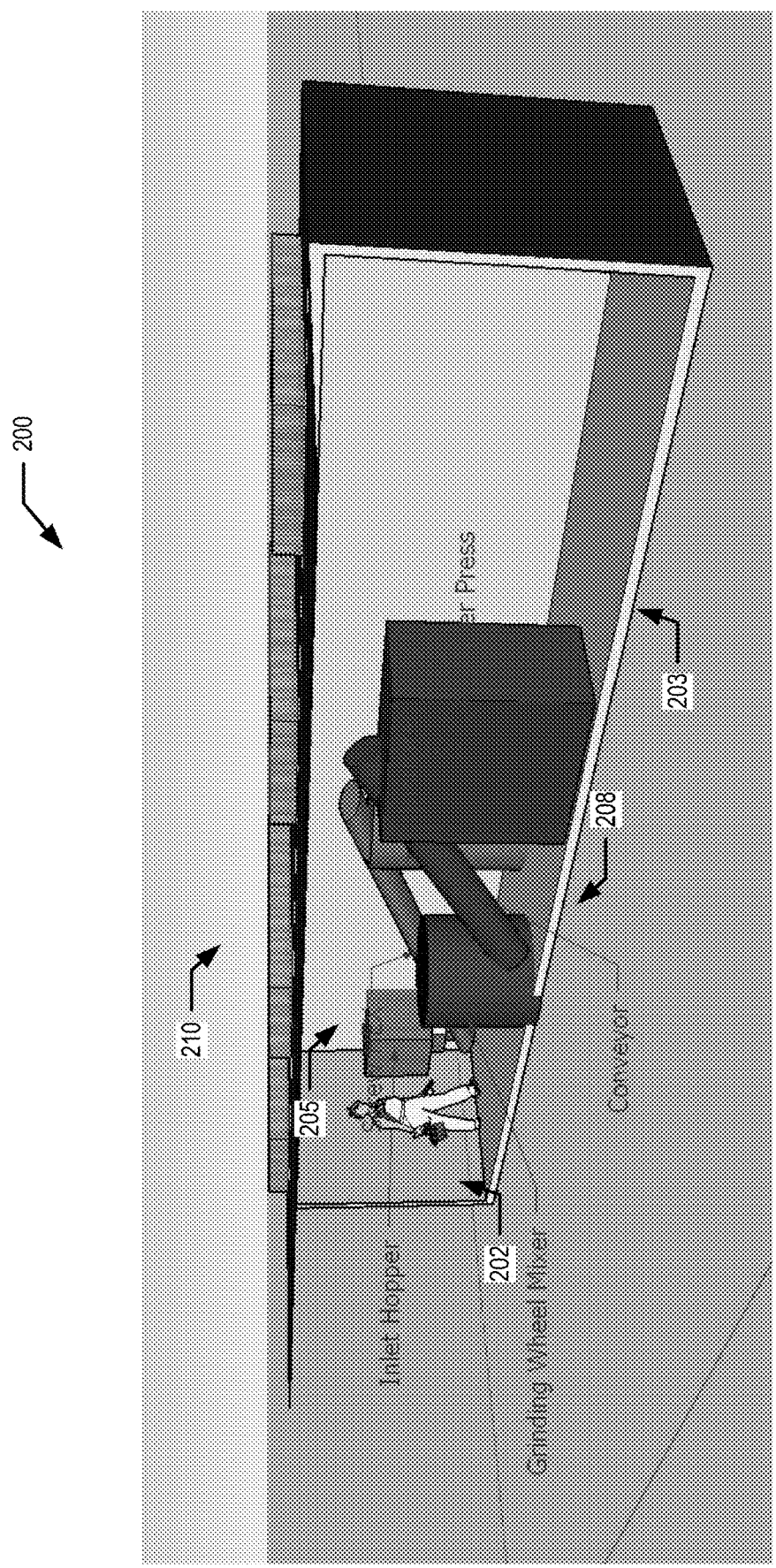
Figure 20:
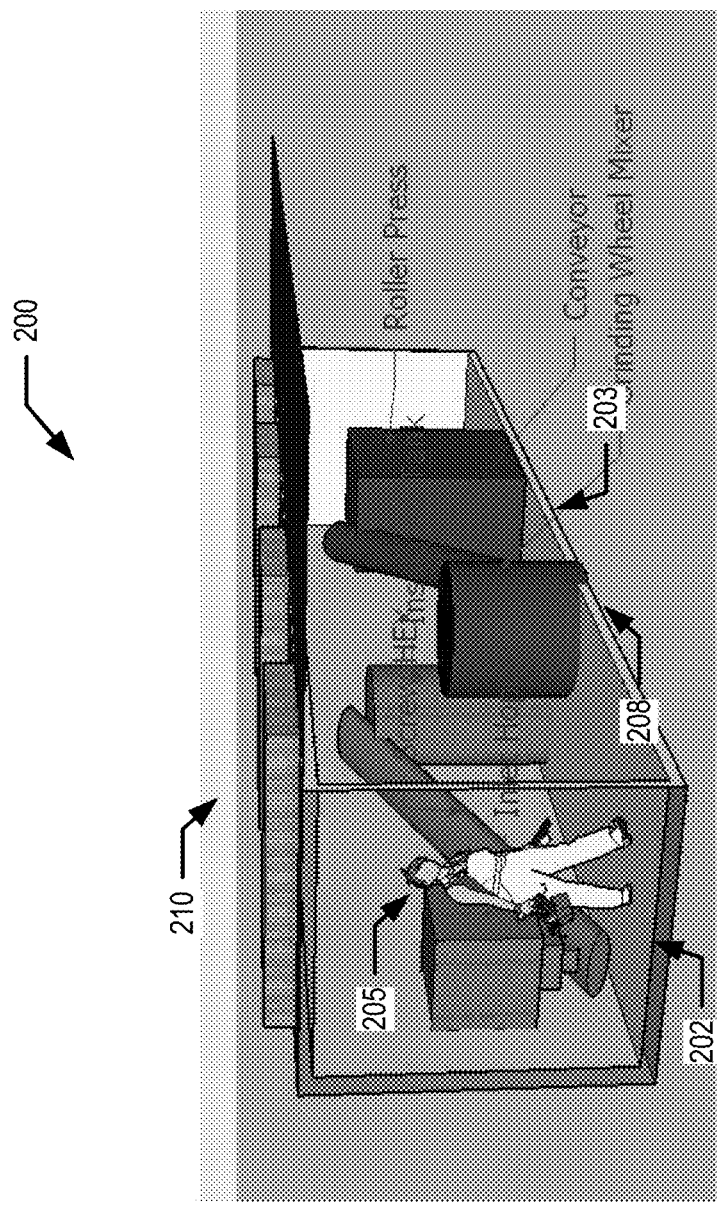
Figure 22:
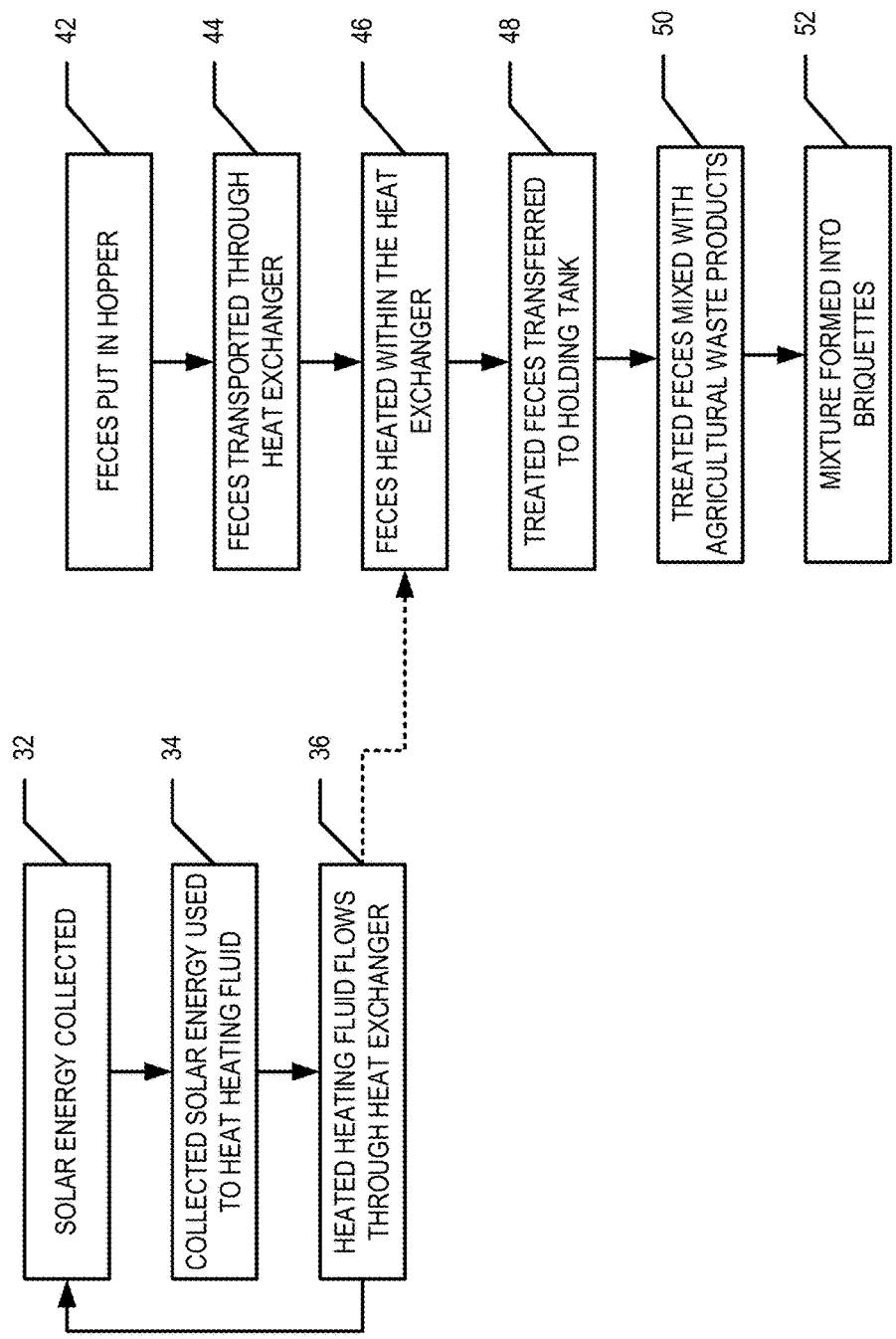

FIG. 7 provides a perspective, top, and two different side views of a support structure configured to support the feces heating portion of the continuous flow treatment apparatus according to one embodiment;

FIG. 8A provides a perspective, top, and two different side views of an insulated holding tank of a continuous flow treatment apparatus according to one embodiment;

FIG. 8B shows a cross-sectional view of holding tank of a continuous flow treatment apparatus according to another embodiment;

FIG. 9 provides a perspective, top, and two different sides views of an inlet of a continuous flow treatment apparatus according to one embodiment;

FIG. 10 provides perspective, cross-sectional, top, and side views of a rotary union assembly of a continuous flow treatment apparatus according to one embodiment;

FIG. 11A provides perspective, top, cross-sectional, and side views of a feces conveyance assembly of a continuous flow treatment apparatus according to one embodiment;

FIG. 11B provides a perspective view of a feces conveyance assembly of a continuous flow treatment apparatus according to another example embodiment;

FIG. 11C provides a cross-sectional view of the feces conveyance assembly shown in FIG. 11B;

FIG. 11D provides an enlarged view of a partial cross-sectional view of the feces conveyance assembly shown in FIG. 11C;

FIG. 12A provides a cross-section view of a portion of a heat exchanger, according to one embodiment;

FIG. 12B provides a perspective view of a portion of a heat exchanger, according to one embodiment;

FIG. 12C provides perspective, side, end, and enlarged partial views of an auger screw according to one embodiment;

FIG. 13 provides various views of a feces treatment portion of the continuous flow treatment apparatus according to one embodiment;

FIG. 14A provides a high level flowchart of a continuous flow waste processing method according to one embodiment;

FIG. 14B provides a high level flowchart of a continuous flow waste processing method according to another embodiment;

FIG. 15 is a piping diagram of a continuous flow treatment apparatus according to one embodiment;

FIG. 16 provides a top and side view of a portion of a continuous flow treatment and briquette apparatus according to one embodiment;

FIG. 17 is a piping diagram of a continuous flow treatment and briquette apparatus according to one embodiment;

FIG. 18 provides a front view, top view, and side view of a heating fluid heating portion of the continuous flow treatment and briquette apparatus according to one embodiment;

FIGS. 19 and 20 are a high level diagrams of a containerized continuous flow treatment and briquette apparatus according to one embodiment;

FIGS. 21A, 21B, and 21C provide a table of parameters corresponding to various components of one embodiment of a continuous flow treatment and briquette apparatus; and FIG. 22 is a high level flowchart of a continuous flow waste product treatment and fuel briquette producing method according to one embodiment.

DETAILED DESCRIPTION OF VARIOUS EMBODIMENTS

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout. In an example embodiment, the term approximately refers to within engineering and/or manufacturing tolerances.

I. OVERVIEW

As noted above, various embodiments of the present invention relate to apparatuses and methods for the sanitary handling of human waste products. In certain embodiments, these apparatuses and methods enable the conversion of human waste products into useful products, such as fuel briquettes. Example embodiments relate to the continuous processing of human waste products such as feces. Some example embodiments relate to the continuous processing of human waste products and conversion of the treated waste products into useful products, such as fuel briquettes. For example, various embodiments allow for processing of feces in a continuous manner rather than in a batched manner (e.g., treating one drum, container, and/or the like of feces independently/at a time).

For example, feces may be collected in a manner similar to that described in U.S. application Ser. No. 15/292,716, filed Oct. 13, 2016, the contents of which are hereby incorporated by reference in their entirety. The feces may then be provided to the inlet of a continuous flow treatment apparatus or a continuous flow treatment and briquette apparatus. The feces may be fed from the inlet into a feces heating portion of the continuous flow treatment apparatus or continuous flow treatment and briquette apparatus where the feces are heated by a heating fluid. In an example embodiment, the feces are heated indirectly by the heating fluid through a wall of a heat exchanger. The heated feces may then be transferred to a holding tank. During the treatment of the feces (e.g., within the heat exchanger and/or within the heat exchanger and the holding tank), the feces are maintained above a predetermined temperature for at least a predetermined time such that the feces are rendered sanitary for storage and/or further processing. The treated feces may be moved through the feces heating portion by a feces conveyance assembly.

In an example embodiment, the holding tank may provide treated feces directly to the mixer of a briquette making portion of a continuous flow treatment and briquette apparatus. Various components of some example embodiments will now be described in more detail.

II. EXEMPLARY CONTINUOUS FLOW TREATMENT APPARATUS

Example embodiments of a continuous flow treatment apparatus may be configured to treat human waste, such as feces, to render them sanitary for further processing. An example embodiment of a continuous flow treatment apparatus is configured to process 680 kg of feces per day. In an example embodiment, the continuous flow treatment apparatus is configured to process 105 kg of feces per hour. The heat used to render the feces sanitary for further processing may be obtained through solar radiation and/or energy collection, burning of biomass waste products (e.g., agricultural waste products, fuel briquettes, woodchips, and/or the like), an electrical heating element, and/or the like. Thus, a continuous flow treatment apparatus may be part of an ecological sanitation system.

FIGS. 1-13 provide various views and/or schematic diagrams of a continuous flow treatment apparatus 100 and/or components thereof. In an example embodiment, the continuous flow treatment apparatus comprises a heating fluid management portion 110 and a feces treatment portion 105. The heating fluid management portion 110 is comprises a solar concentrator 112 and a heating fluid heating tank 114. The solar concentrator 112 is configured to receive solar energy (e.g., electromagnetic energy such as infrared, optical, and/or ultraviolet radiation) from the sun and concentrate the solar energy onto a heating fluid heating tank 114. In an example embodiment, the heating fluid management portion 110 further comprises heating fluid storage tanks 115a, 115b, one or more pumps 116, one or more expansion tanks 117, and various pressure gauges, pressure safety valves, heating fluid draining and/or filling valves, air release valves, temperature gauges, and/or the like.

The feces treatment portion 105 may comprise an inlet 145, heat exchanger 130, and a holding tank 140. Untreated feces may be provided into the inlet 145 and transported through the heat exchanger 130 by a conveyance assembly 120. As the conveyance assembly 120 transports the feces through the heat exchanger 130, the feces absorb heat from the heating fluid (e.g., being pumped through the inner heating pipe 136 and/or the outer jacket 135). The heated feces are deposited into the holding tank 140 by the conveyance assembly 120. In an example embodiment, the feces are heated to a minimum temperature before being deposited into the holding tank 140. In an example embodiment, the feces are heated to a minimum temperature for at least a predetermined time within the heat exchanger 130 before the feces are deposited into the holding tank 140. In an example embodiment, the holding tank 140 is insulated and the heated feces are held in the holding tank 140 for a predetermined time above a minimum temperature. The predetermined time and the minimum temperature are configured to ensure that the treated feces exiting the feces treatment portion 105 has been rendered sanitary for storage and/or further processing. Various components of the continuous flow treatment apparatus 100 will now be described in more detail.

Exemplary Heating Fluid Management Portion

FIGS. 1-5 show various views and/or schematic diagrams of example heating fluid management portions 110 of example continuous flow treatment apparatus 100, according to various embodiments. In an example embodiment, the heating fluid management portion 110 comprises a solar concentrator 112. The solar concentrator may be a parabolic mirror, Scheffler mirror, solar air or fluid heater, a reflective solar dish, and/or the like. In an example embodiment, the solar concentrator 112 is a solar dish having a 16 square meter collection area. In another example embodiment, the solar concentrator 112 is a fixed focus parabolic dish having a 5 square meter collection area. The solar concentrator may be mounted and/or affixed to a solar concentrator support structure 111. The solar concentrator may be pointed, rotated, adjusted, and/or the like by a tracking mechanism 113. The tracking mechanism 113 may be configured to align the solar concentrator 112 with the sun so as to maximize the amount of solar radiation and/or energy provided to the heating fluid heating tank 114. In an example embodiment, the tracking mechanism 113 is a pendulum tracking system. In an example embodiment, the solar concentrator 112 is manually or automatically rotated back to a designated morning position each evening after completion of running for the day.

The heating fluid heating tank 114 may be configured to receive solar energy and/or radiation directed toward the heating fluid tank 114 by the solar concentrator 112. The solar energy and/or radiation incident upon the heating fluid heating tank 114 may then be used to heat heating fluid within the heating fluid heating tank 114. In an example embodiment, the heating fluid is a water/propylene glycol mix. In an example embodiment, the heating fluid is water such that low-pressure steam is generated and passed through the outer jacket 135 and condensate is collected from the lower point of the heat exchanger 130. The heating fluid may be heated within the heating fluid heating tank 114 by solar radiation and/or by heat released by burning biomass (e.g., agricultural waste products, fuel briquettes, and/or the like). In an example embodiment, the heating fluid is heated to temperatures in excess of 90° C. In an example embodiment, the heating fluid may be heated up to 125° C. In an example embodiment, if the heating fluid reaches a temperature of 125° C., a human operator or automated operation system may take action to reduce the heating fluid temperature. For example, a valve (e.g., a ball valve) below the large heating fluid storage tank 115b may be opened, the conveyance assembly 120 may be loaded with more feces, the solar concentrator 112 may be stopped from the tracking the sun for a period of time, and/or the like.

The heating fluid management portion 110 further comprises one or more heating fluid storage tanks 115a, 115b. In an example embodiment, the small heating fluid storage tank 115a is a 20 liter storage tank and the large heating fluid storage tank 115b is a 180 liter storage tank. In an example embodiment, the heating fluid within the small heating fluid storage tank 115a reaches a temperature of 120° C. and the heating fluid within the large heating fluid storage tank 115b reaches a temperature of 100° C. In an example embodiment, the flow between the heating fluid heating tank 114 and the small heating fluid storage tank 115a is primarily and/or purely by convection.

The hot heating fluid may be pumped by pump 116 into the heat exchanger 130 (e.g., through the heating fluid input connection 128 and/or into the inner heating pipe 136, as shown in FIGS. 6B and 11A and 11D). While in the heat exchanger 130, heat may transfer from the heating fluid to the feces in the conveyance assembly 120, thereby heating the feces and cooling the heating fluid. The cooled heating fluid exits the heat exchanger 130 (e.g., via heating fluid output connection 129), and is returned to a heating fluid storage tank 115 or the heating fluid heating tank 114 to be heated again. One or more pumps 116 may be responsible for pumping the heating fluid into and/or out of the heat exchanger 130 and/or the heating fluid heating tank 114, heating fluid storage tank 115a, 115b, and/or other portion of the heating fluid management portion 110. In an example embodiment, one or more of the pumps 116 are selectively activated by a temperature differential controller (TDC). In an example embodiment, the TDC will activate when there is a 5-10° C. temperature differential between the bottom of the small heating fluid storage tank 115a and the temperature of the heating fluid exiting the heat exchanger 130 (e.g., through heating fluid output connection 129 and/or through the inner heating pipe 136 shown in FIGS. 6B and 11A) and provide power to the pump 116. In an example embodiment, the pump 116 is connected to 230 VAC, single phase and is wired through an ordinary socket that may be switch controlled. For example, the human operator and/or the automated operation system may activate the switch. The heating fluid is pumped through the heat exchanger 130 in a direction opposite the direction of the movement of the feces through the heat exchanger 130 (as caused by the conveyance assembly 120).

In an example embodiment, a valve (e.g., a ball valve), air release valve, and a safety pressure and/or temperature valve are installed at the highest point of the plumbing en route to the heat exchanger 130. The heating fluid management portion 110 may further comprise an expansion tank 117 situated between the heat exchanger 130 and the pump 116. The expansion tank 117 is fitted with a pressure gauge. In an example embodiment, a 300 liter plastic tank is fitted above all piping and fittings to facilitate filling the heating fluid management portion 110 by gravity. In an example, a valve is installed at the lowest point of the piping such that the heating fluid may be drained from the heating fluid management portion 110. The piping, storage tanks 115a, 115b, and/or expansion tank 117, may be insulated to prevent heat loss from the heating fluid management portion 110. The piping and other components of the heating fluid management portion 110 may be configured for use in a pressurized and/or high pressure system. In an example embodiment, the heating fluid management portion 110 may comprise an electric heating element and/or a boiler 112' for heating the heating fluid through the burning of biomass on cloudy days and/or to supplement the heating provided by solar energy and/or radiation.

Exemplary Feces Treatment Portion

FIGS. 1-4, 6A, 6B, 6C, 6D, 7, 8A, 8B, 9, 10, 11A, 11B, 11C, 11D, 12A, 12B, and 13 provide various views and/or schematic diagrams of various example feces treatment portions 105 of various embodiments of a continuous flow treatment apparatus 100. In an example embodiment, the feces treatment portion 105 of the continuous flow treatment apparatus 100 comprises an inlet 145, a heat exchanger 130, and a holding tank 140. In an example embodiment, the inlet 145 may be configured to receive feces. In an example embodiment, the inlet 145 is a hopper. The feces may then be transported through the heat exchanger 130 by the conveyance assembly 120. The conveyance assembly 120 may provide the heated feces to the holding tank 140. The treated feces may be removed from the holding tank 140 for further processing (e.g., for use in making fuel briquettes).

The opening of the inlet 145 may be covered by a screen 146 configured to remove any coarse solids from the feces being provided to the inlet 145. In an example embodiment, the screen has 6 mm apertures. In an example embodiment, the inlet 145 may be equipped with a lid that may be closed when feces are not being actively loaded into the inlet 145. The inlet 145 further comprises an outlet coupled to an input end of the heat exchanger 130. For example, the outlet of the inlet 145 is configured to provide feces to the heat exchanger 130. In particular, the feces exit the outlet of the inlet 145 and enters the entrance of the conveyance assembly 120 to be transported through the heat exchanger 130. In various embodiments, the entrance of the conveyance assembly 120 is the entrance to the feces channel 122 located at a first position of the heat exchanger 130.

The heat exchanger 130 comprises an insulation 137 about an outer jacket 135. The heat exchanger 130 further comprises a conveyance assembly 120 that transports feces through the heat exchanger 130 within the outer jacket 135. In an example embodiment, the heat exchanger 130 further comprises an inner heating pipe 136 disposed within the conveyance assembly 120 and extending along the length thereof. Heating fluid is circulated through the heat exchanger 130 (e.g., through the fluid channel 121 of outer jacket 135 and/or the inner heating pipe 136) to provide heat to the feces being transported through the heat exchanger 130 by the conveyance assembly 120. In various embodiments, the path along which the conveyance assembly 120 transports the feces through the heat exchanger 130 has a path length of 5-7 meters.

In an example embodiment, the heat exchanger 130 comprises an outer jacket 135 having insulation 137 wrapped there-around. An inner jacket 126 is disposed within the outer jacket 135 and is concentric with the outer jacket 135. A fluid channel 121 is disposed between the outer jacket 135 and the inner jacket 126. The inner jacket 126 is configured to contain the feces as the feces is conveyed through the heat exchanger 130. The inner jacket 126 is separated from the outer jacket 135 by one or more spacers 127. The spacers may comprise two or more spacers (e.g., four spacers) evenly spaced about the perimeter of the inner jacket 126. In an example embodiment, the spacers 127 are welded and/or secured to the exterior of the inner jacket 126. In various embodiments, the spacers 127 are not welded and/or secured to the outer jacket 135. In an example embodiment, the space between the inner jacket 126 and the outer jacket 135 defines the heating fluid channel 121. The conveyance assembly 120 is disposed within the inner jacket 126. In an example embodiment, the inner jacket 126 is made of stainless-steel or another thermally conductive material.

In an example embodiment, the conveyance assembly 120 comprises an auger screw 123. For example, an auger screw 123 may be disposed within the feces channel 122 defined by the inner jacket 126. In example embodiments, the feces channel 122 is 2-8 inches in diameter. As the auger screw 123 rotates, it carries feces through the heat exchanger 130 on the blades 124 thereof. In an example embodiment, the blades 124 may be configured to scrape the interior surface of the feces channel 122 (e.g., the inner surface of the inner jacket 126). In an example embodiment, the inner heating pipe 136 runs through the inner spine 125 of the auger screw. In an example embodiment, the inner spine 125 is blinded and no heating fluid is provided there-through. In an example embodiment, the auger screw 123 is constructed of stainless-steel or another appropriate material.

In an example embodiment, the blades 124 of the auger screw 123 define an angle $\alpha$. In an example embodiment, the angle $\alpha$ is approximately 8°. In an example embodiment, the blade 124 extends approximately 26 mm from the inner spine 125 of the auger screw 123. In an example embodiment, the diameter of the inner spine 125 is approximately 85 mm. In an example embodiment, the thickness of the blade 124 is approximately 2 mm.

In an example embodiment, the conveyance assembly 120 is configured to transport feces through the heat exchanger 130 at a steady rate. For example, in one embodiment, the conveyance assembly 120 transports feces through the heat exchanger 130 at a rate 25 kg per hour. In an example embodiment, the conveyance assembly 120 is powered by a motor. In an example embodiment, the conveyance assembly 120 is powered by a 1.1 kW three phase motor. The speed of the conveyance assembly 120 may be manually adjusted by, for example, changing the gear on the motor. In an example embodiment, the motor that powers the conveyance assembly has a variable speed drive.

When the feces reaches the end of the conveyance assembly 120, the heated feces exit the feces channel 122 at a second position of the heat exchanger 130. In various embodiments, the feces exiting the heat exchanger at the second position are deposited into the holding tank 140. The holding tank 140 may be configured to receive heated feces through an opening located in the top of the holding tank 140. In an example embodiment, the holding tank 140 is a heated and/or insulated holding tank and is configured to maintain the heated feces above a minimum temperature for a predetermined amount of time within the holding tank 140 such that the feces may be treated such that it is rendered sanitary for further processing before the treated feces exits the holding tank 140. For example, in an example embodiment, the holding tank 140 comprises insulation 142 and holding cavity 144. In an example embodiment, the heated feces leaves the conveyance assembly 120 at approximately 90° C. or hotter. In an example embodiment, the heated feces is maintained at a temperature greater than 80° C. within the holding tank 140 for at least one hour to treat the feces to render it sanitary for further processing. In another example embodiment, the heated feces is maintained at a temperature greater than 65° C. within the holding tank 140 for at least three hours to treat the feces to render it sanitary for further processing. In an example embodiment, the feces are treated sufficiently through heating as the feces traverses the heat exchanger 130 to be rendered sanitary for storage and/or further handling and the holding tank 140 is not insulated.

In an example embodiment, the holding tank 140 may comprise a second conveyance assembly similar to conveyance assembly 120 configured to transport the heated feces through the holding tank 140 at a rate that ensures the heated feces is fully treated and in a manner that ensures that the feces just entering the holding tank 140 does not contaminate the treated feces that is already in the holding tank 140.

In an example embodiment, feces enters the holding tank 140 through a top opening 141. In an example embodiment, the top opening 141 has a removable mesh thereon comprising a mesh sized to reduce and/or prevent flies from entering the holding tank 140. In an example embodiment, the feces exits the holding tank 140 through a bottom opening 143. In an example embodiment, the bottom opening 143 is selectively closed by a clamped closure. In an example embodiment, a seal is disposed about the bottom opening 143 for sealing the bottom opening 143 when the clamped closure is in a closed position. In an example embodiment, the clamped closure is configured to selectively move between a closed position and an opened position through a hinged rotation. In an example embodiment, the holding tank 140 further comprises a conical hopper having an exit control valve 147 (e.g., a bolted flange gate valve) located near the bottom of the conical hopper (e.g., below the midpoint of the holding tank 140). In an example embodiment, the valve controls the flow of treated feces into a bottom chamber of the conical hopper defined by the exit control valve 147 and the bottom opening 143.

In an example embodiment, the bottom chamber has a volume similar to and/or less than the volume of the storage tank and/or bucket 150. In an example embodiment, the holding tank 140 (e.g., the conical hopper that defines the holding cavity 144) and/or the exit control valve 147 is made of stainless-steel or another appropriate material. Treated feces may be removed from the bottom of the holding tank 140 and sanitarily stored or processed further. For example, the holding tank 140 may comprise a gate valve and/or a clamped closure at the bottom thereof to provide a selectively openable bottom opening 143. In an example embodiment, a three inch gate valve is disposed at the bottom of the holding tank 140. In an example embodiment, the holding tank 140 may have an access door on the top thereof. For example, the access door may be approximately 12 inches by 12 inches, and/or the like.

As noted above, in an example embodiment, the conveyance assembly 120 may comprise an auger screw 123 or other rotating mechanism that transports the feces through the heat exchanger 130. In such embodiments, the heat exchanger 130 may comprise one or more rotary union assemblies 131 to accommodate the rotation of the auger screw 123 or other rotating mechanism and the heating fluid input and output connections 128, 129. As shown in FIG. 10, the rotary union assembly 131 may comprise a housing 132, shaft 133, and one or more seals 134 (e.g., 134A, 134B). The housing 132 and shaft 133 may be configured to rotate with respect to one another. The one or more seals 134 may be configured to define and/or separate fluid channels through the rotary union assembly 131. For example, the rotary union assembly 131 may comprise a cool/output heating fluid channel, a hot/input heating fluid channel, and/or a feces channel. The seals 134 may be configured to prevent contamination of, for example, the hot/input heating fluid channel, by cool/exiting heating fluid and/or feces.

The feces treatment portion 105 and/or some of the components thereof may be supported by support structure 138. For example, the heat exchanger 130 may be mounted to the support structure 138. In an example embodiment, the support structure 138 is made of welded metal components.

Exemplary Method of Using a Continuous Flow Treatment Apparatus

FIG. 14A is a flowchart illustrating an example method of treating feces using a continuous flow treatment apparatus, such as, for example, the continuous flow treatment apparatus 100. Starting at block 2, solar energy and/or radiation is collected. For example, a solar concentrator 112 may be used to collect and/or focus solar energy and/or radiation. The solar energy and/or radiation may be used to heat heating fluid at block 4. For example, the solar concentrator 112 may be gather solar energy and focus the solar energy onto the heating fluid heating tank 114. Heating fluid within the heating fluid heating tank 114 may then be heated by the concentrated solar energy and/or radiation incident on the heating fluid heating tank 114. At block 6, the heated heating fluid is pumped through the heat exchanger 130. For example, the pump 116 may pump hot heating fluid through the heat exchanger 130. Heat may be transferred from the heating fluid to the feces within the heat exchanger 130. The cooled/spent heating fluid may then be returned to the heating fluid heating tank 114 for reheating.

At block 12, feces is provided to the continuous flow treatment apparatus 100. For example, a human operator and/or an automated operation system may provide feces to the inlet 145 through the inlet opening. The feces may pass through screen 146 disposed in the inlet opening as it enters the inlet 145 to remove any coarse solid material from the feces. At block 14, the feces is provided to the conveyance assembly 120. For example, the feces may pass through the outlet of the inlet 145 and be provided to the conveyance assembly 120. The conveyance assembly 120 may then transport the feces through the heat exchanger 130.

As the feces is transported through the heat exchanger 130, the feces is heated by absorbing heat from the heat exchanger 130 and the heating fluid circulating through the fluid channel 121 and/or the inner heating pipe 136 as the feces travels through the feces channel 122, at block 16. In an example embodiment, the feces may be heated to a temperature of at least 90° C. as the feces is transported through the heat exchanger 130. At block 18, the treated feces enters the holding tank 140. For example, the treated feces enters the holding tank 140 through the top opening 141. In an example embodiment, the treated feces is retained within the holding cavity 144 via the exit control valve 147 and/or the clamped closure sealingly closing the bottom opening 143. When the feces is to be removed from the holding tank 140, the feces exits the holding cavity 144 via the value 147 and/or bottom opening 143 into the storage tank and/or bucket 150.

FIG. 14B provides a flowchart illustrating another example method of treating feces using a continuous flow treatment apparatus, such as, for example, the continuous flow treatment apparatus 100. The flowchart provided by FIG. 14B is similar to the flowchart provided by FIG. 14A through block 16. However, different from FIG. 14A, the process illustrated by FIG. 14B pass from block 16 to block 20.

At block 20, the heated feces enters the holding tank 140. In an example embodiment, the heated feces is at a temperature of 90° C. or more when the heated feces enters the holding tank 140. At block 22, the heated feces is treated within the holding tank 140 by being maintained above a minimum temperature for at least a minimum amount of time. In an example embodiment, the heated feces is maintained at a temperature greater than 80° C. within the holding tank 140 for at least one hour to treat the feces to render it sanitary for further processing. In another example embodiment, the heated feces is maintained at a temperature greater than 65° C. within the insulated heating tank 140 for at least three hours to treat the feces to render it sanitary for further processing. At block 24, the treated feces is removed from the holding tank 140. For example, the treated feces may exit the holding tank 140 and stored or further processed. For example, in an example embodiment, the treated feces may be further processed to produce fuel briquettes.

III. EXEMPLARY CONTINUOUS FLOW TREATMENT AND BRIQUETTE APPARATUS

Example embodiments of a continuous flow treatment and briquette apparatus may be configured to treat human waste, such as feces, to render them sanitary for further processing. The continuous flow treatment and briquette apparatus may then process the treated feces to provide a useful product, such as fuel briquettes. An example embodiment of a continuous flow treatment and briquette apparatus is configured to process 680 kg of feces per day. In an example embodiment, the continuous flow treatment and briquette apparatus is configured to process 105 kg of feces per hour. In an example embodiment, the continuous flow treatment and briquette apparatus may be housed within a container 201 (see FIG. 15). The container 201 may be a repurposed shipping container or a container built specifically for housing a continuous flow treatment and briquette apparatus. The heat used to render the feces sanitary for further processing may be obtained through solar radiation and/or energy collection, electrical heating source, and/or burning of biomass waste products (e.g., agricultural waste products, fuel briquettes, woodchips, and/or the like). Thus, a continuous flow treatment and briquette apparatus may be part of an ecological sanitation system.

FIGS. 15-20 provide various views and/or schematic diagrams of a continuous flow treatment and briquette apparatus 200 and/or components thereof. FIGS. 21A, 21B, and 21C provide a table of some parameters corresponding to an example embodiment. In an example embodiment, the continuous flow treatment and briquette apparatus 200 comprises a heating fluid management portion 210, a feces treatment portion 205, and a briquette producing portion 208. The heating fluid management portion 210 is comprises one or more solar heating components 212 and one or more heating fluid heating tubes 214.

The solar heating components 212 are configured to receive solar energy (e.g., electromagnetic energy such as infrared, optical, and/or ultraviolet radiation) from the sun and transfer a substantial portion of the received solar energy to heating fluid within the heating fluid heating tubes 214. In an example embodiment, the heating fluid management portion 210 further comprises electric heating source 213 and/or a boiler (e.g., similar to boiler 112'), one or more hot water tanks 215, one or more pumps 216, one or more expansion tanks 217, and various pressure gauges, pressure safety valves, heating fluid draining and/or filling valves, air release valves, temperature gauges, and/or the like.

In an example embodiment, the feces treatment portion 205 of the continuous flow treatment and briquette apparatus 200 may be similar to the feces treatment portion 105 of the continuous flow treatment apparatus 100. The feces treatment portion 205 may comprise an inlet 245, heat exchanger 230, and a holding tank 240. Untreated feces may be provided into the inlet 245 and transported through the heat exchanger 230 by a conveyance assembly. In an example embodiment, the inlet 245 is a hopper. As the conveyance assembly transports the feces through the heat exchanger 230, the feces absorb heat from the heating fluid (e.g., being pumped through the outer jacket). The heated feces are deposited into the holding tank 240 by the conveyance assembly. In an example embodiment, the feces are heated to a predetermined temperature before being deposited into the holding tank 240. In an example embodiment, the heated feces are held in the holding tank 240 and/or processed through the heat exchanger 230 for a predetermined time above a minimum temperature. The predetermined time and the minimum temperature are configured to ensure that the treated feces exiting the holding tank 240 has been rendered sanitary for further processing.

In an example embodiment, the treated feces from the holding tank 240 may be provided to the briquette producing portion 208. In an example embodiment, the briquette producing portion 208 comprises a mixer 270, a conveyor 260, and a briquette press 250. For example, the mixer 270 may be a grinding wheel mixer. The mixer 270 may be configured to mix the treated feces with biomass (e.g., agricultural waste, biomass waste, charcoal, and/or the like). The feces and biomass mixture may be provided to the briquette press by conveyor 260. In an example embodiment, the conveyor 260 may be a conveyor belt. In another example, the conveyor 260 may be a bucket conveyor, and/or the like. The briquette press 250 may be configured to form fuel briquettes from the feces and biomass mixture. In an example embodiment, the briquette press 250 is a roller press.

In an example embodiment, the continuous flow treatment and briquette apparatus 200 is powered through a power grid. In another embodiment, the continuous flow treatment and briquette apparatus 200 is powered by one or more (e.g., two) generators. For example, various components of the continuous flow and briquette apparatus 200 may be powered by a single phase and/or three phase generator.

Various components of the continuous flow treatment and briquette apparatus 200 will now be described in more detail.

Exemplary Heating Fluid Management Portion

FIGS. 15-20 show various views and/or schematic diagrams of example heating fluid management portions 210 of example continuous flow treatment apparatus 100 and/or portions thereof, according to various embodiments. In an example embodiment, the heating fluid management portion 210 comprises one or more solar heating components 212. The solar heating components 212 may be an array of evacuated solar tubes, solar fluid heaters, solar air heaters, a solar panel for powering an electric heating source, a parabolic mirror, a Scheffler mirror, a reflective solar dish, and/or the like. In an example embodiment, the solar heating components 212 are configured to collect solar energy and provide the solar energy to the heating fluid as it passes through heating tubes 214. Thus, the solar heating components 212 are configured to use solar energy to heat the heating fluid. In an example embodiment, the heating fluid flows through the heating tubes 214 and is heated therein by solar energy captured by the solar heating components 212. The heating fluid exiting the heating tubes 214 may be warm heating fluid. In an example embodiment, the heating fluid is a water/propylene glycol mix. In an example embodiment, the heating fluid is water such that low-pressure steam is generated and passed through the outer jacket and condensate is collected from the lower point of the heat exchanger 230.

The warm heating fluid may be further heated using an electrical heating source 213 and/or boiler (e.g., similar to boiler 112'). In an example embodiment, the electrical heating source 213 may be within the hot heating fluid storage tank 215. In an example embodiment, the electrical heating source 213 is a 5 kW electrical heating element. In an example embodiment, the hot heating fluid storage tank is a 400 liter insulated fluid storage tank. In an example embodiment, the heating fluid is heated to temperatures in excess of 90° C. In an example embodiment, the heating fluid may be heated up to 125° C. In an example embodiment, if the heating fluid reaches a temperature of 125° C., a human operator or automated operation system may take action to reduce the heating fluid temperature. For example, a valve (e.g., a ball valve) below the hot heating fluid storage tank 215 may be opened, the conveyance assembly may be loaded with more feces, the electrical heating source 213 may be turned off for a period of time, and/or the like.

The hot heating fluid may be pumped by pump 216 into the heat exchanger 230 (e.g., through the heating fluid input connection and/or into the inner heating pipe). While in the heat exchanger 230, heat may transfer from the heating fluid to the feces in the conveyance assembly, thereby heating the feces and cooling the heating fluid. The cooled heating fluid exits the heat exchanger 230, and is returned to the heating tubes 214 to be heated again. One or more pumps 216 may be responsible for pumping the heating fluid into and/or out of the heat exchanger 230 and/or the heating tubes 214, hot fluid storage tank 115, and/or other portion of the heating fluid management portion 210. In an example embodiment, one or more of the pumps 216 are selectively activated by a temperature differential controller (TDC). In an example embodiment, the TDC will activate when there is a 5-10° C. temperature differential between the fluid in the hot heating fluid storage tank 215 and the temperature of the heating fluid exiting the heat exchanger 230 (e.g., through heating fluid output connection and/or through the inner heating pipe) and provide power to the pump 216. In an example embodiment, the pump 216 is connected to 230 VAC, single phase and is wired through an ordinary socket that may be switch controlled. For example, the human operator and/or the automated operation system may activate the switch. The heating fluid is pumped through the heat exchanger 230 in a direction opposite the direction of the movement of the feces through the heat exchanger 230 (as caused by the conveyance assembly).

In an example embodiment, a valve (e.g., a ball valve), air release valve, and a safety pressure and/or temperature valve are installed at a high point of the plumbing en route to the heat exchanger 230. The heating fluid management portion 210 may further comprise an expansion tank 217 situated between the heat exchanger 230 and the pump 216. The expansion tank 217 is fitted with a pressure gauge. In an example embodiment, a plastic tank is fitted above the all piping and fittings to facilitate filling the heating fluid management portion 210 by gravity. In an example, a valve is installed at the lowest point of the piping such that the heating fluid may be drained from the heating fluid management portion 210. The piping, hot heating fluid storage tank 215, and/or expansion tank 217, may be insulated to prevent heat loss from the heating fluid management portion 210. The piping and other components of the heating fluid management portion 210 may be configured for use in a pressurized and/or high pressure system. In an example embodiment, the heating fluid management portion 210 may comprise a boiler for heating the heating fluid through the burning of biomass on cloudy days and/or to supplement the heating provided by solar energy and/or radiation. In an example embodiment, the boiler may be included in the heating fluid management portion 210 in place of and/or in addition to the electrical heating source 213.

Exemplary Feces Treatment Portion

FIGS. 15-17 and 19-20 provide various views and/or schematic diagrams of various example feces treatment portions 205 of various embodiments of a continuous flow treatment and briquette apparatus 200. In an example embodiment, the feces treatment portion 205 of the continuous flow treatment and briquette apparatus 200 may be similar to the feces treatment portion 105 of the continuous flow treatment and briquette apparatus 100. For example, the feces treatment portions 205 comprises an inlet 245, a heat exchanger 230, and a holding tank 245. In an example embodiment, the inlet 245 may be configured to receive feces. The feces may then be transported through the heat exchanger 230 by the conveyance assembly. The conveyance assembly may provide the heated feces to the holding tank 240. The treated feces may be removed from the holding tank 240 and provided to the briquette producing portion 208. In an example embodiment, the feces treatment portion 205 does not comprise a holding tank 240 and the treated feces are provided directly from the heat exchanger 230 to the briquette producing portion 208 via manual conveyance and/or an automated conveyance system.

The opening of the inlet 245 may be covered by a screen configured to remove any coarse solids from the feces being provided to the inlet 245. In an example embodiment, the screen has 6 mm apertures. In an example embodiment, the inlet 245 may be equipped with a lid that may be closed when feces is not being actively loaded into the inlet 245. The inlet 245 further comprises an outlet configured to provide feces to the heat exchanger 230. In particular, the feces exits the outlet of the inlet 245 and enters the entrance of the conveyance assembly to be transported through the heat exchanger 230.

The heat exchanger 230 comprises insulation about an outer jacket. In an example embodiment, the insulation comprises outer mineral wool with aluminum cladding. The heat exchanger 230 further comprises a conveyance assembly that transports feces through the heat exchanger 230 within the outer jacket. In an example embodiment, the heat exchanger 230 further comprises an inner jacket disposed within the conveyance assembly and extending along the length thereof. Heating fluid is circulated through the heat exchanger 230 (e.g., through the fluid channel of outer jacket and/or the inner heating pipe) to provide heat to the feces being transported through the heat exchanger 230 by the conveyance assembly. In example embodiments, the path along which the conveyance assembly transports the feces through the heat exchanger 230 has a path length of 5-7 meters.

In an example embodiment, the heat exchanger 230 comprises an outer jacket (e.g., similar to out heating jacket 135) having insulation (e.g., similar to insulation 137) wrapped there-around. An inner jacket (e.g., similar to inner jacket 126) is disposed within the outer jacket and is concentric with the outer jacket. A heating fluid channel (e.g., similar to heating fluid channel 121) is disposed between the outer jacket and the inner jacket. The inner jacket is configured to contain the feces as the feces is conveyed through the heat exchanger 230. The inner jacket is separated from the outer jacket by one or more spacers (e.g., similar to 127). The spacers may comprise two or more spacers (e.g., four spacers) evenly spaced about the perimeter of the inner jacket. In an example embodiment, the spacers are welded and/or secured to the exterior of the inner jacket. In various embodiments, the spacers are not welded and/or secured to the outer jacket. In an example embodiment, the space between the inner jacket and the outer jacket 135 defines the heating fluid channel. The conveyance assembly (e.g., similar to conveyance assembly 120) is disposed within the inner jacket. In an example embodiment, the inner jacket is made of stainless-steel or another thermally conductive material.

In an example embodiment, the conveyance assembly comprises an auger screw (e.g., similar to auger screw 123). For example, an auger screw may be disposed within the feces channel (e.g., similar to feces channel 122) defined by the inner jacket. In example embodiments, the feces channel is 2-8 inches in diameter. As the auger screw rotates, it carries feces through the heat exchanger 230 on the blades thereof. In an example embodiment, the blades may be configured to scrape the interior surface of the feces channel (e.g., the inner surface of the inner jacket). In an example embodiment, an inner heating pipe runs through the inner spine of the auger screw. In an example embodiment, the inner spine is blinded and no heating fluid is provided there-through. In an example embodiment, the auger screw is constructed of stainless-steel or another appropriate material.

In an example embodiment, the blades of the auger screw define an angle α. In an example embodiment, the angle α is approximately 8°. In an example embodiment, the blade extends approximately 26 mm from the inner spine of the auger screw. In an example embodiment, the diameter of the inner spine is approximately 85 mm. In an example embodiment, the thickness of the blade is approximately 2 mm.

In an example embodiment, the conveyance assembly is configured to transport feces through the heat exchanger 230 at a steady rate. For example, in one embodiment, the conveyance assembly transports feces through the heat exchanger 230 at a rate 25 kg per hour. In an example embodiment, the conveyance assembly is powered by a motor 218. In an example embodiment, the conveyance assembly is powered by a 1.1 kW three phase motor. The speed of the conveyance assembly may be manually adjusted by, for example, changing the gear on the motor. In an example embodiment, the motor that powers the conveyance assembly has a variable speed drive.

When the feces reaches the end of the conveyance assembly, the heated feces may be deposited into the holding tank 240. The holding tank 240 may be configured to receive heated feces through an opening located in the top of the holding tank 240. The heated feces may be maintained above a minimum temperature for a predetermined amount of time within the holding tank 240 such that the feces may be treated such that it is rendered sanitary for further processing before the treated feces exits the insulated heating tank 240. In an example embodiment, the feces entering the holding tank have been rendered sanitary for storage and/or further treatment within the heat exchanger 230. In an example embodiment, the heated feces leaves the heat exchanger 130 at approximately 90° C. or hotter. In an example embodiment, the heated feces is maintained at a temperature greater than 80° C. within the insulated heating tank 240 for at least one hour to treat the feces to render it sanitary for further processing. In another example embodiment, the heated feces is maintained at a temperature greater than 65° C. for at least three hours to treat the feces to render it sanitary for further processing. In an example embodiment, the insulated heating tank 240 may comprise a second conveyance assembly similar to conveyance assembly configured to transport the heated feces through the holding tank 240 at a rate that ensures the heated feces is fully treated and in a manner ensures that the feces just entering the holding tank 240 does not contaminate the treated feces that is already in the holding tank 240 (e.g., in an example embodiment, where the treatment of the feces continues in an insulated holding tank 240).

In an example embodiment, feces enters the holding tank 240 through a top opening (e.g., similar to top opening 141). In an example embodiment, the top opening has a removable mesh thereon comprising a mesh sized to reduce and/or prevent flies from entering the holding tank 240. In an example embodiment, the feces exits the holding tank 240 through a bottom opening 243. In an example embodiment, the bottom opening 243 is selectively closed by a clamped closure or valve. In an example embodiment, a seal is disposed about the bottom opening 243 for sealing the bottom opening 243 when the clamped closure is in a closed position. In an example embodiment, the clamped closure is configured to selectively move between a closed position and an opened position through a hinged rotation. In an example embodiment, the holding tank 240 further comprises a conical hopper having an exit control valve (e.g., similar to exit control valve 147) located near the bottom of the conical hopper (e.g., below the midpoint of the holding tank 240). In an example embodiment, the exit control valve controls the flow of treated feces into a bottom chamber of the conical hopper defined by the exit control valve and the bottom opening 243. In an example embodiment, the bottom chamber has a volume similar to and/or less than the volume of the storage tank and/or bucket 150. In an example embodiment, the holding tank 140 (e.g., the conical hopper that defines the holding cavity 144) and/or the exit control valve is made of stainless-steel or another appropriate material. Treated feces may be removed from the bottom of the holding tank 240 and sanitarily stored or processed further. For example, the holding tank 240 may comprise a gate valve and/or a clamped closure at the bottom thereof to provide a selectively openable bottom opening 243. In an example embodiment, a three inch gate valve is disposed at the bottom of the holding tank 240. In an example embodiment, the holding tank 240 may have an access door on the top thereof. For example, the access door may be approximately 12 inches by 12 inches, and/or the like.

As noted above, in an example embodiment, the conveyance assembly may comprise an auger screw or other rotating mechanism that transports the feces through the heat exchanger 230. In such embodiments, the heat exchanger 230 may comprise one or more rotary union assemblies to accommodate the rotation of the auger screw or other rotating mechanism and the heating fluid input and output connections. The rotary union assembly may comprise a housing, shaft, and one or more seals. The housing and shaft may be configured to rotate with respect to on another. The one or more seals may be configured to define and/or separate fluid channels through the rotary union assembly. For example, the rotary union assembly may comprise a cool/output heating fluid channel, a hot/input heating fluid channel, and/or a feces channel. The seals may be configured to prevent contamination of, for example, the hot/input heating fluid channel, by cool/exiting heating fluid and/or feces.

The feces treatment portion 205 and/or some of the components thereof may be supported by support structure. For example, the heat exchanger 230 may be mounted to the support structure. In an example embodiment, the support structure is made a welded metal components. In an example embodiment, the feces treatment portion 205 is mounted and/or secured within container 201.

FIGS. 21A and 21B provide a table of parameters for a heat exchanger 230, inlet 245, and holding tank 240 of an example embodiment of a continuous flow treatment and briquette apparatus 200. FIG. 21C provides expected power consumption for various components and expected power loads for generators of the continuous flow treatment and briquette apparatus 200, for an example embodiment.

Exemplary Briquette Producing Portion

In an example embodiment, the briquette producing portion 208 comprises a mixer 270, a conveyor 260, and a briquette press 250. In an example embodiment, the mixer 270 is configured to receive treated feces and biomass (e.g., carbonized agricultural waste products, and/or the like) and combine the treated feces and biomass. The treated feces and biomass mixture is provided to the briquette press 250 from the mixer 270 by the conveyor 260. The briquette press 250 is configured to receive the treated feces and biomass mixture and mold and/or form the mixture into individual briquettes. In an example embodiment, mixer 270 is a grinding wheel mixer. In an example embodiment, the conveyor 260 is a conveyor belt or a bucket conveyor. In an example embodiment, the briquette press 250 is a roller press.

According to various embodiments, the treated feces may be combined with biomass, such as carbonized agricultural waste products, to create fuel briquettes by the mixer 250. In particular, the treated feces acts as a binder for producing fuel briquettes comprising biomass such as carbonized agricultural waste products. Indeed, approximately 30% of the solid content of human feces is composed of cellulose material. In addition to inactivating pathogens resident within the feces, the treatment of the feces also causes the cellulose material in the feces to undergo a phase transition. In particular, the cellulose material may be forced into a glassy transition state where there is a higher mobility of molecules. This higher mobility of the molecules within the cellulose material allows for improved binding of the carbonized agricultural waste.

Before the biomass, such as agricultural waste is provided to the mixer 270, the agricultural waste is first carbonized. For example, the agricultural waste products may comprise rose waste. In various embodiments, the carbonization of the agricultural waste products may occur in four stages. In the first stage, the agricultural waste products are dried to reduce the amount of water within the agricultural waste products. In various embodiments, the drying process is completed a temperature of, for example, 110-200° C. The second stage, the pre-carbonization stage, occurs at approximately 170-300° C. wherein endothermic reactions cause the production of pyroligneous liquids such as methanol and acetic acid and some non-condensable gases such as carbon monoxide and carbon dioxide. The third stage, occurs at approximately 250-300° C. In the third stage, exothermic reactions produce and/or release the bulk of light tars and pyroligneous acids produced in the pyrolysis process from the biomass of the agricultural waste product(s). During the final stage, at temperatures greater than 300° C., the biomass of the agricultural waste product(s) is transformed into charcoal. In some embodiments, the carbonized agricultural waste product(s) are ground to provide a fine charcoal dust.

Next, the charcoal of the carbonized agricultural waste product is combined with the treated feces within the mixer 270. In particular, the feces may be treated to inactivate pathogens resident within the feces and to cause the cellulose material in the feces to undergo a phase transition that transforms the feces into a material that may be used as a binder in the resulting briquettes. For example, the treated feces is mixed into a homogeneous mixture and water is added to reach about 70% moisture level. In some embodiments, the treated feces is mixed into a homogenous mixture and water is added to reach about 80% moisture level by, for example, the mixer 270. It is then combined with the carbonized biomass dust in the mixer 270 to create the final charcoal product. In some embodiments, additional water is added in the mixer 270 to create the final charcoal product. As an example, the carbonized agricultural waste product(s) and the treated feces may be combined at a ratio of 5:2 by mass (carbonized waste:feces). In another example, approximately 15 liters of homogenous mixture of treated feces having a moisture level of approximately 80% is mixed with approximately 45 liters of water and approximately 130 kg of carbonized agricultural waste product(s). In an example embodiment, the 130 kg of carbonized agricultural waste product(s) are provided as a fine charcoal dust. In yet another example, carbonized agricultural waste product(s), saw dust, and the treated feces may be combined at a ratio of 2:1:1 by mass (carbonized waste:saw dust:feces).

The biomass and treated feces mixture is then transported from the mixer 270 to the briquette press 250 by the conveyor 260. The briquette press 250 is configured to form the carbonized agricultural waste product(s) and treated feces mixture into briquettes. The treated feces acts to bind the carbonized agricultural waste product(s) together to provide fuel briquettes that are not brittle and do not release a significant amount of charcoal dust. In an example embodiment, the briquette press 250 continuously rolls the carbonized dust and the binder creating larger and larger charcoal until they reach the desired size (e.g., 2 inch diameter spheres). This process can produces, for example, 1 ton per hour. In another example embodiment, the briquette press 250 may be configured to form the treated feces and biomass (e.g., carbonized agricultural waste) mixture into fuel briquettes using various press roller techniques.

Exemplary Container

In an example embodiment, the continuous flow treatment and briquette apparatus 200 is housed within a container 201. For example, the container 201 may be a re-purposed shipping container. In an example embodiment, the container 201 is a 40 foot long container. In an example embodiment, one or more ends of the container 201 comprise double doors 202. For example, the double doors 202 are fully opening double doors. In an example embodiment, one side of the container 201 is an opening side 203. For example, the opening side 203 may comprise a rolling door, a lightweight swing door, an overhead door, and/or the like.

Thus, when the continuous flow treatment and briquette apparatus 200 is operating, a significant amount of ventilation may be provided. In an example embodiment, the solar heating components 212 and heating tubes 214 are secured to the roof of the container 201. The hot heating fluid tank 215, pump 216 (and possibly other components of the heating fluid management portion 210), feces treatment portion 205, and briquette producing portion 208 may be housed within the container 201. For example, components of the feces treatment portion 205 and the briquette producing portion 208 (e.g., support structure to which the heat exchanger 230 is mounted) may be secured to the floor of the container 201. The floor of the container 201 may be configured for regular (e.g., daily, weekly, and/or the like) washing. In an example embodiment, the container 201 comprises a wall or barrier configured to isolate the inlet 245 and bottom of the heat exchanger 230 from the remaining components within the container 201 to prevent contamination of the treated feces by the untreated feces being loaded into the inlet 245. In an example embodiment, lighting may be installed within the container 201 to provide adequate lighting for a human operator of the continuous flow treatment and briquette apparatus 200.

Exemplary Method of Using a Continuous Flow Treatment and Briquette Apparatus

FIG. 22 is a flowchart illustrating an example method of treating feces and producing fuel briquettes using a continuous flow treatment and briquette apparatus, such as, for example, the continuous flow treatment and briquette apparatus 200. Starting at block 32, solar energy and/or radiation is collected. For example, one or more solar heating components 212 may be used to collect and/or focus solar energy and/or radiation. The solar energy and/or radiation may be used to heat heating fluid at block 34. For example, the solar heating components 212 gather solar energy and focus the solar energy onto the heat tubes 214. Heating fluid within the heating tubes 214 is then heated by the concentrated solar energy and/or radiation provided by the solar heating components 214. In an example embodiment, additional heating of the heating fluid is accomplished through the use of an electrical heating source 213 and/or a boiler configured to produce heat by burning biomass. At block 36, the heated heating fluid is pumped through the heat exchanger 230. For example, the pump 216 may pump hot heating fluid through the heat exchanger 230. In an example embodiment, the hot heating fluid is low pressure steam. Heat may be transferred from the heating fluid to the feces within the heat exchanger 230. The cooled/spent heating fluid is then returned to the heating tubes 214 for reheating.

At block 42, feces is provided to the continuous flow treatment and briquette apparatus 200. For example, a human operator and/or an automated operation system may provide feces to the inlet 245 through the inlet opening. The feces may pass through a screen 246 disposed in the inlet opening as it enters the inlet 245 to remove any coarse solid material from the feces. At block 44, the feces is provided to the conveyance assembly. For example, the feces may pass through the outlet of the inlet 245 and be provided to the conveyance assembly. The conveyance assembly may then transport the feces through the heat exchanger 230.

As the feces is transported through the heat exchanger 230, the feces is heated by absorbing heat from the heat exchanger 230 and the heating fluid circulating through the fluid channel and/or the inner heating pipe as the feces travels through the feces channel, at block 46. In an example embodiment, the heating fluid may be heated to a temperature of at least 90° C. as the feces is transported through the heat exchanger 230. In an example embodiment, as the feces is transported through the heat exchanger 230 such that the heated feces is maintained at a temperature greater than 80° C. for at least one hour to treat the feces to render it sanitary for further processing. In another example embodiment, the heated feces is maintained at a temperature greater than 65° C. within the heat exchanger 230 for at least three hours to treat the feces to render it sanitary for further processing. For example, in an example embodiment, the feces exiting the heat exchanger 230 has been rendered sanitary for storage and/or further processing. At block 48, the treated feces enters the holding tank 240.

At block 50, the treated feces is removed from the holding tank 240. For example, the treated feces may exit the holding tank 240 and be provided to a briquette producing portion 208 of the continuous flow treatment and briquette apparatus 200. In particular, the treated feces is removed from the holding tank 240 and provided to a mixer 270, in an example embodiment. In an example embodiment, a human operator may collect treated feces exiting the holding tank 240 and provide the treated feces to the mixer 270. In another example embodiment, the gate valve and/or clamped closure at the bottom of the holding tank 240 may be positioned such that treated feces exiting the holding tank 240 are directly provided to the mixer 270. In another example embodiment, a treatment to mixer conveyor transports the treated feces from the gate valve of the holding tank 240 to the mixer 270. The treated feces are mixed with biomass (e.g., carbonized agricultural waste material) within the mixer 270. For example, the mixer 270 may mix the treated feces and biomass. The conveyor 260 may then transport the treated feces and biomass mixture from the mixer 270 to the briquette press 250.

At block 52, the treated feces and biomass mixture is formed into fuel briquettes. For example, the briquette press 250 may form the treated feces and biomass mixture into fuel briquettes.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A continuous flow treatment apparatus comprising:
a heating fluid management portion configured to heat heating fluid and provide the heated heating fluid to a heat exchanger; and
a feces treatment portion comprising the heat exchanger, the heat exchanger configured to receive feces at a first position of the heat exchanger, indirectly heat the feces via the heated heating fluid as the feces are transported from the first position to a second position of the heat exchanger, and provide the heated feces at the second position, wherein the feces are maintained at a minimum temperature for at least a minimum amount of time such that the feces exiting the feces treatment portion have been rendered sanitary for at least one of storage or further processing, wherein the heated heating fluid comprises steam.

2. The continuous flow treatment apparatus of claim 1, wherein the heating fluid management portion comprises a solar concentrator.

3. The continuous flow treatment apparatus of claim 1 further comprising a holding tank configured to receive feces from the second position of the heat exchanger.

4. The continuous flow treatment apparatus of claim 1, wherein the heat exchanger comprises an inner jacket having a conveyance assembly therein, the conveyance assembly configured to transport the feces from the first position to the second position.

5. The continuous flow treatment apparatus of claim 4, wherein the conveyance assembly comprises an auger screw.

6. The continuous flow treatment apparatus of claim 4, wherein the inner jacket defines a feces channel through which the feces is transported from the first position to the second position.

7. The continuous flow treatment apparatus of claim 4, further comprises an outer jacket, the inner jacket being disposed within the outer jacket and concentric therewith, wherein a space located between the inner jacket and the outer jacket defines a heating fluid channel, the heated heating fluid provided to the heating fluid channel.

8. The continuous flow treatment apparatus of claim 7, further comprising insulation disposed about the outer jacket.

9. The continuous flow treatment apparatus of claim 7, wherein the heating fluid management portion comprises a pump configured to pump heated heating fluid into the heating fluid channel.

10. A continuous flow treatment and briquette apparatus comprising:
a heating fluid management portion configured to heat heating fluid and provide the heated heating fluid to a heat exchanger;
a feces treatment portion comprising the heat exchanger, the heat exchanger configured to receive feces at a first position of the heat exchanger, indirectly heat the feces via the heated heating fluid as the feces are transported from the first position to a second position of the heat exchanger, and provide the heated feces at the second position, wherein the feces are maintained at a minimum temperature for at least a minimum amount of time such that the feces exiting the feces treatment portion have been rendered sanitary for at least one of storage or further processing, wherein the heated heating fluid comprises steam; and
a briquette producing portion configured to receive the feces that exited feces treatment portion and generate fuel briquettes comprising the received feces.

11. The continuous flow treatment and briquette apparatus of claim 10, wherein the briquette producing portion comprises:
a mixer; and
a briquette press.

12. The continuous flow treatment and briquette apparatus of claim 11, wherein the mixer is configured to mix the received feces with carbonized biomass to generate a feces biomass mixture.

13. The continuous flow treatment and briquette apparatus of claim 12, wherein the mixer is further configured to mix the received feces with at least one of saw dust and water.

14. The continuous flow treatment and briquette apparatus of claim 11, wherein the mixer is grinding wheel mixer.

15. The continuous flow treatment and briquette apparatus of claim 11, wherein the carbonized agricultural waste is provided to the mixer as a fine charcoal dust.

16. The continuous flow treatment and briquette apparatus of claim 11, wherein the briquette press is a roller press.

17. The continuous flow treatment and briquette apparatus of claim 10, wherein the heating fluid management portion comprises a solar concentrator.

18. A method comprising:
heating a heating fluid using at least a solar concentrator;
providing the heated heating fluid to a heating fluid channel of a heat exchanger, wherein the heated heating fluid comprises steam;
providing feces to a feces channel at a first position of the heat exchanger;
transporting the feces through the feces channel from the first position to a second position of the heat exchanger using a conveyance assembly such that the feces is heated to a minimum temperature for at least a minimum amount of time as the feces are transported from the first position to the second position; and
providing the feces from the second position of the heat exchanger, wherein the feces exiting the heat exchanger at the second position has been rendered sanitary for at least one of storage or further processing.

19. The method of claim 18, further comprising:
providing the feces from the second position of the heat exchanger to a mixer;
combining, with the mixer, the feces with carbonized biomass to generate a feces biomass mixture;
providing the feces biomass mixture to a briquette press; and
making, with the briquette press, fuel briquettes from the feces biomass mixture.

* * * * *